(12) United States Patent
Tahara et al.

(10) Patent No.: US 6,449,414 B1
(45) Date of Patent: Sep. 10, 2002

(54) LOW CHROMATIC ABERRATION ROD LENS ARRAY, ITS UNIT AND IMAGE SCANNER EMPLOYING THEM

(75) Inventors: Yasuteru Tahara; Teruta Ishimaru; Yoshihiro Uozu; Toshinori Sumi, all of Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/297,061
(22) PCT Filed: Oct. 27, 1997
(86) PCT No.: PCT/JP97/03894
§ 371 (c)(1),
(2), (4) Date: Apr. 29, 1999
(87) PCT Pub. No.: WO98/19185
PCT Pub. Date: May 7, 1998

(30) Foreign Application Priority Data

Oct. 31, 1996 (JP) ............................... 8-289705

(51) Int. Cl.$^7$ ............................... G02B 6/18; G02B 3/00
(52) U.S. Cl. ...................... 385/120; 359/652; 359/654
(58) Field of Search ........................... 385/124, 120, 385/115, 116, 121, 123; 359/654, 900, 652, 653, 618, 619, 620; 250/227.11

(56) References Cited

U.S. PATENT DOCUMENTS

| | | | | |
|---|---|---|---|---|
| 3,721,828 A | * | 3/1973 | Parks ...................... | 250/220 R |
| 4,258,978 A | * | 3/1981 | Cole ....................... | 350/96.25 |
| 4,405,207 A | * | 9/1983 | Kay ........................ | 350/320 |
| 4,589,736 A | * | 5/1986 | Harrigan et al. ............ | 350/413 |
| 5,287,222 A | * | 2/1994 | Uozu et al. ................ | 359/654 |
| 5,321,429 A | * | 6/1994 | Ono et al. ................. | 346/107 R |
| 5,390,274 A | * | 2/1995 | Toyoda et al. .............. | 385/124 |
| 5,814,524 A | * | 9/1998 | Walt et al. ................ | 436/518 |

FOREIGN PATENT DOCUMENTS

| | | | | |
|---|---|---|---|---|
| JP | 50-97341 | * | 8/1975 | .......... G03G/15/01 |
| JP | 57-86816 | * | 5/1982 | .......... G02B/27/18 |
| JP | 60-150007 | | 8/1985 | .......... G02B/5/20 |
| JP | 63-76567 | | 4/1986 | .......... H04N/1/04 |
| JP | 63-76576 | * | 4/1986 | .......... H04N/1/04 |
| JP | 61-93766 | * | 5/1986 | .......... H04N/1/028 |
| JP | 62229210 A | | 11/1987 | .......... G01B/6/42 |
| JP | 64-26702 | * | 2/1989 | |
| JP | 1-230014 | | 9/1989 | .......... G02B/26/00 |
| JP | 3-174105 | * | 7/1991 | |
| JP | 3-230101 | | 10/1991 | .......... G02B/5/20 |
| JP | 4-81702 | | 3/1992 | .......... G02B/5/20 |
| JP | 06331822 | * | 12/1994 | .......... G02B/5/20 |
| JP | 07248549 | | 9/1995 | .......... G03B/27/72 |
| JP | 58-162164 | | 9/1995 | |

\* cited by examiner

*Primary Examiner*—Frank G. Font
*Assistant Examiner*—Michael P. Mooney
(74) *Attorney, Agent, or Firm*—Oblon, Spivak, McClelland, Maier & Neustadt, P.C.

(57) ABSTRACT

A color image scanner is constructed by a three primary color LED array (4) for illuminating an original (2) to be read out, a monochromatic image sensor array (3) and a rod lens array (1) disposed between the original (1) and the image sensor array (3). The focusing parameters of the three kinds of refractive index distribution type rod lenses (11, 12, 13) constituting the rod lens array (1) are set so that each of the operating wavelength band and the predetermined wavelength is different among the kinds, the lens length $Z_o$ is equal among the kinds, and the conjugate length TC at each predetermined wavelength is substantially equal among all the kinds. Accordingly, when a color image reading operation is carried out by using the rod lens array which is effective in compactness and brightness, the chromatic aberration of the rod lens array can be sufficiently reduced and high-resolution can be implemented at low cost.

30 Claims, 17 Drawing Sheets

F I G. 16
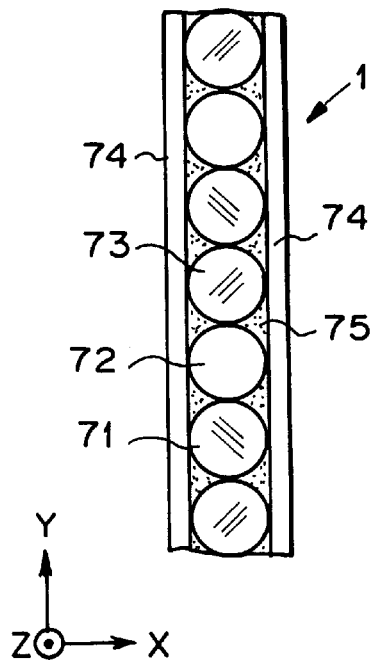
F I G. 17
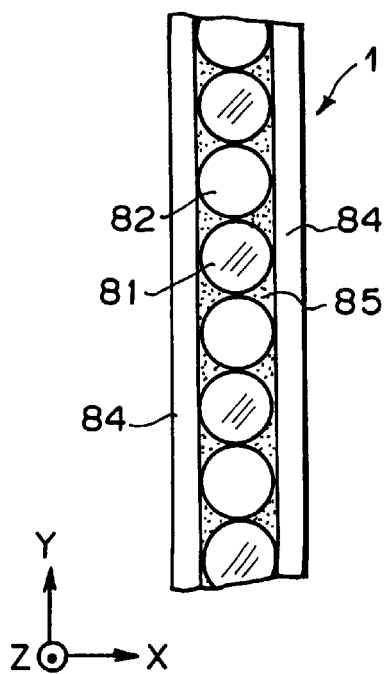

F I G.20
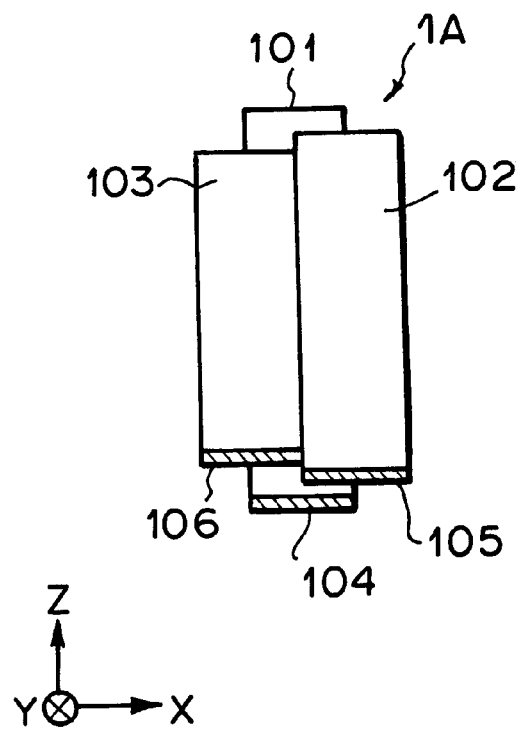
F I G.21
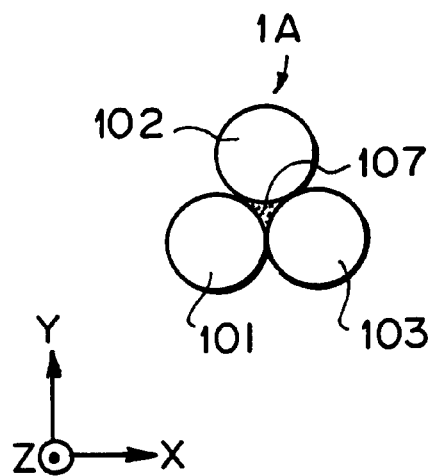

F I G. 22
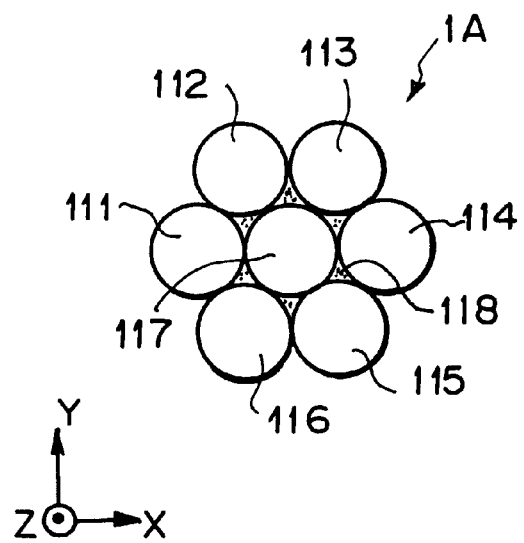
F I G. 23
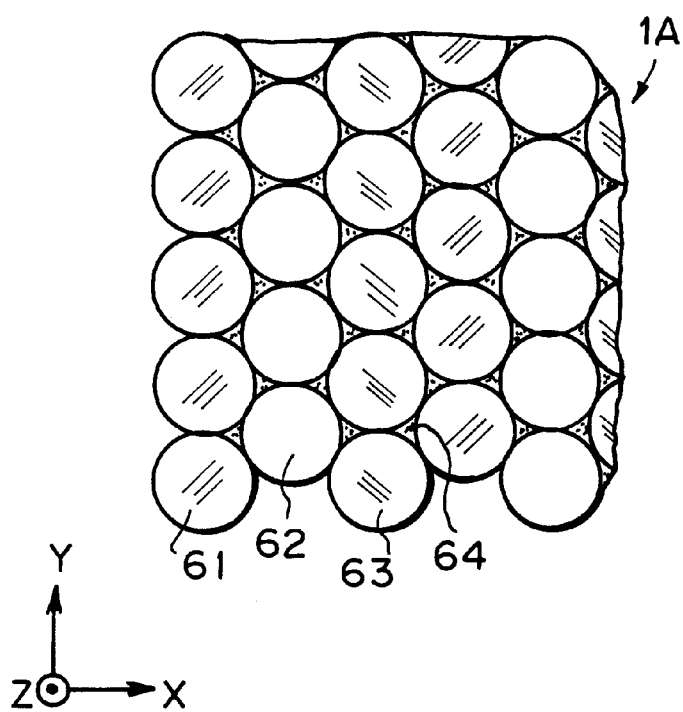

F I G. 29
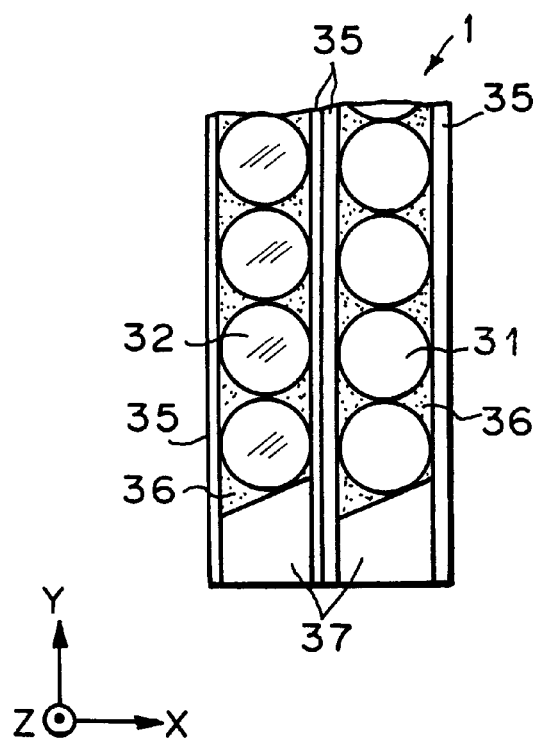
F I G. 30
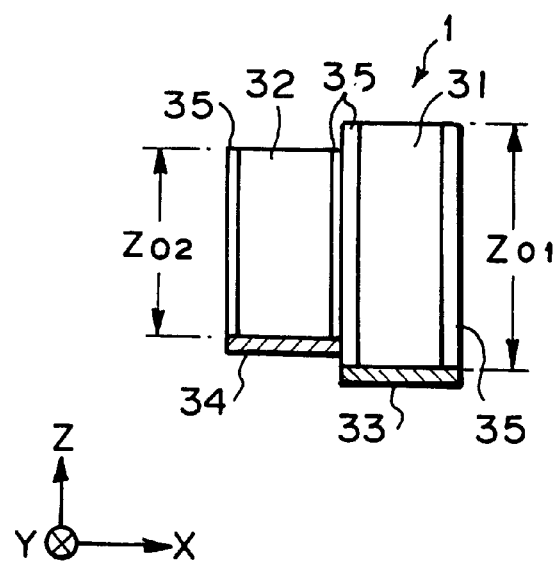

LOW CHROMATIC ABERRATION ROD LENS ARRAY, ITS UNIT AND IMAGE SCANNER EMPLOYING THEM

TECHNICAL FIELD

The present invention relates to a color image reading technique, and particularly to a rod lens array as an equi-magnified imaging device constituting an image reading optical system and a unit therefor, and an image scanner (image reading device) using the rod lens array or the unit. Further, the present invention relates to an improvement to achieve high resolution by reducing chromatic aberration.

BACKGROUND TECHNIQUE

A rod lens array has been widely used as an equi-magnified imaging device constituting an image reading optical system for an original moving type image scanner (containing an image reader in a facsimile machine, a digital copying machine or the like) because it has advantages that the conjugate length thereof is short, the rod lens array itself is light and it can be manufactured at a low cost.

However, the conventional rod lens arrays have a disadvantage that the chromatic aberration thereof is generally large except for some of them in which the conjugate length is long and the numerical aperture thereof is relatively small (so-called dark). Therefore, these conventional rod lens arrays have been mainly used for monochromatic image reading.

However, color image reading has been recently required, and thus the rod lens arrays have been expected to be used for color image reading in order to positively utilize the above advantages of the rod lens arrays. In order to satisfy this requirement, the chromatic aberration of the rod lens arrays must be reduced.

The focusing parameter g of a square-distribution medium such as a rod lens is given according to the following equation (1):

$$g^2 = 2[n_o - n(r)]/(n_o r^2) \quad (1)$$

Here, r represents the distance from the optical axis of the rod lens in the radial direction, $n_o$ represents the refractive index on the optical axis of the rod lens, and $n(r)$ represents the refractive index at the position which is at the distance r in the radial direction from the optical axis of the rod lens.

The conjugate length TC of an equi-magnified rod lens is given according to the following equation (2):

$$TC = Z_o - [2/(n_o g)] \tan[(Z_o g)/2] \quad (2)$$

Here, $Z_o$ represents the length of the rod lens.

In the equation (1), since both of $n_o$ and $n(r)$ has wavelength-dependence (wavelength dispersion), g also shows wavelength-dependence. Accordingly, TC calculated according to the equation (2) has wavelength-dependence. Therefore, the imaging position and the magnification are different between light beams which are different in wavelength (color). Accordingly, when color image reading is carried out by using a conventional rod lens array comprising a plurality of rod lenses arranged, the resolution is lowered due to chromatic aberration.

In order to reduce the chromatic aberration, the rod lens has been hitherto manufactured by using materials having low wavelength dispersion. For example, in the case of glass rod lenses formed by an ion exchange method, it has been proposed to reduce the chromatic aberration by suitably selecting the kind and concentration of ions (K. FUJII, MOC [Microoptics Conference]/GRIN'93 KAWASAKI: G13). Further, in the case of plastic rod lenses, the rod lenses are manufactured by using MMA (methyl methacrylate)-based polymer which has relatively small wavelength dispersion of plastics (see Japanese Patent Application Laid-open No. Hei-3-174105).

However, there has not yet been provided any rod lens for which both of reduction in conjugate length and reduction in chromatic aberration (enhancement in resolution) can be performed at the same time and which can be manufactured at low cost.

The resolution can be estimated by measuring MTF (Modulation Transfer Function), for example.

FIG. 31 shows a method of measuring MTF. A rod lens array 101 having a conjugate length TCs at a predetermined wavelength λs (the arrangement direction of the rod lenses is vertical to the sheet surface) is put on a measuring apparatus, and a standard rectangular grating 102 and a CCD image sensor array (the arrangement direction of photodetecting elements of the sensor is vertical to the sheet surface) 103 are fixed while the distance TCx between the standard rectangular grating 102 and the CCD image sensor 103 is adjusted to be equal to the conjugate length TCs. The spatial frequency of the standard rectangular grating 102 is set to 6[1 p/mm], for example. Monochromatic light obtained by passing light from a light source (not shown in the figure) through a spectroscope 104 is converted to diffused light by a diffusion plate 106, and then irradiated to the rectangular grating 102. An image of the rectangular grating 102 is focused onto the image sensor array 103 by the rod lens array 101. MTF in each wavelength is measured by varying the wavelength of light emitted from the spectroscope 104.

MTF of each wavelength is obtained by the following equation:

$$MTF[\%] = [(I_{MAX} - I_{MIN})/(I_{MAX} + I_{MIN})] \times 100$$

Here, $I_{MAX}$ and $I_{MIN}$ represent the maximum light amount and the minimum light amount measured by the image sensor array 103, respectively.

The definition of MTF and the measuring method as described above are disclosed in Japanese Patent Application Laid-open No. Hei-3-174105.

In general, the refractive index distribution of the rod lens array 101 is not ideal, and thus MTF of an image of the rectangular grating 102 which is focused onto the image sensor array 103 by the rod lens array 101 is not equal to 100%.

FIGS. 32 and 33 show examples of MTF measured by the above method. In both of the examples, the predetermined wavelength λs is set to 570 nm, and TCx=TCs is set to 9.1 mm. FIG. 32 shows a measurement result of a glass rod lens array (SLA20D produced by Nippon Sheet Glass Co., Ltd.), and FIG. 33 shows a measurement result of a plastic rod lens array (RA89S produced by Mitsubishi Rayon Co., Ltd.). In all the cases, MTF has the maximum value at the predetermined wavelength λs, however, the MTF value is greatly varied depending on the wavelength and the chromatic aberration is large.

Further, not only a white-color light source used in combination with a color image sensor array, but also a three primary color light source including a blue light emission LED, a green light emission LED and a red light emission LED which are used in combination with a monochromatic image sensor array are used as a light source usable in the color image scanner. The light emission spectra of these LEDs are shown in FIG. 34. The light emission peak of the blue light emission LED appears at about 450 nm, the light emission peak of the green light emission LED appears at about 525 nm and the light emission peak of the red light emission LED appears at about 660 nm (the blue light emission LED and the green light emission LED are described in "Applied Physics", Vol 65. No. 7, 676(1996)). As described above, the wavelength range of the three primary color light source is smaller than the whole range of the visible range, however, there is a 210 nm wavelength interval between the peak wavelength of the blue light emission LED and the red light emission LED. The following table 1 shows MTF values (at 6 [1 p/mm]) of the conventional rod lens arrays having the characteristics shown in FIGS. 32 and 33 at the peak wavelengths of the three primary color light sources.

TABLE 1

| ROD LENS ARRAY | PEAK WAVELENGTH [nm] | | |
|---|---|---|---|
| | 450 | 525 | 660 |
| SLA20D | 13% | 78% | 53% |
| RA89S | 27% | 63% | 59% |

As is apparent from the table 1, with respect to the conventional rod lens arrays, even when three primary color light sources are used, the MTF values at the wavelength 450 nm are equal to or less than 50% and this indicates that it is insufficient to enhance the resolution of the image scanner.

Therefore, the present invention has been implemented in view of the foregoing situation, and has an object to sufficiently reduce the chromatic aberration of a rod lens array to enhance the resolution when a color image reading operation is carried out by using a rod lens array having a relatively short conjugate length (for example, about 9.1 mm) which is effective in miniaturization and brightness.

SUMMARY OF THE INVENTION

In order to attain the above object, according to the present invention, there is provided a rod lens array containing plural kinds of refractive index distribution type rod lenses, characterized in that the plural kinds of refractive index distribution type rod lenses have respective operating wavelength bands and respective predetermined wavelengths which are different between the kinds, each predetermined wavelength being set within each operating wavelength band, and the conjugate length at each predetermined wavelength is set to be substantially equal between the plural kinds of refractive index distribution type rod lenses.

In the rod lens array of an aspect of the present invention, the refractive index distribution type rod lenses are bonded to one another so as to be arranged in parallel to one another and aligned with one another in at least one direction perpendicular to the optical axis direction.

In the rod lens array of an aspect of the present invention, each of the operating wavelength bands is set by effecting passing wavelength band restriction for a color-less rod lens.

In the rod lens array of an aspect of the present invention, each of the operating wavelength bands is set by arranging a passing wavelength band restricting member on the optical path of light passing through a color-less rod lens.

In the rod lens array of an aspect of the present invention, the passing wavelength band restricting member is bonded to the end face of the rod lens.

In the rod lens array of an aspect of the present invention, the passing wavelength band restricting member is disposed away from the end face of the rod lens.

In the rod lens array of an aspect of the present invention, the refractive index distribution type rod lenses are colored.

In the rod lens array of an aspect of the present invention, at least one predetermined wavelength is the peak wavelength at which an emission spectrum of the three primary color light source shows a peak value.

In the rod lens array of an aspect of the present invention, the plural kinds of refractive index distribution type rod lenses are equal to one another in length among all the kinds, and have focusing parameters which are different among the kinds.

In the rod lens array of an aspect of the present invention, the plural kinds of refractive index distribution type rod lenses have the same focusing parameter among all the kinds, and are different in length among the kinds.

In the rod lens array of an aspect of the present invention, the plural kinds of refractive index distribution type rod lenses are arranged so that the same kind of refractive index distribution type rod lenses are aligned with one another in a first direction perpendicular to the optical axis direction, but are not adjacent to one another in a second direction perpendicular to the optical axis direction.

In the rod lens array of an aspect of the present invention, the plural kinds of refractive index distribution type rod lenses are arranged through bulkheads in the second direction.

In the rod lens array of an aspect of the present invention, the plural kinds of refractive index distribution type rod lenses are arranged so that the same kind of refractive index distribution type rod lenses are not adjacent to one another.

In the rod lens array of an aspect of the present invention, the plural kinds of refractive index distribution type rod lenses are arranged in alignment with one another in a first direction perpendicular to the optical axis direction.

Further, in order to attain the above object, according to the present invention, there is provided a rod lens array unit containing plural kinds of refractive index distribution type rod lenses, characterized in that the plural refractive index distribution type rod lenses have respective operating wavelength bands and predetermined wavelengths which are different among the kinds, the conjugate length at each of the predetermined wavelengths different among the kinds is set to be substantially equal among all the kinds, and the plural refractive index distribution type rod lenses are bonded to one another so as to be arranged in parallel to one another.

In the rod lens array unit of an aspect of the present invention, the plural refractive-index distribution type rod lenses are arranged in such a form that the rod lens of the adjacent units can be bonded to one another when plural rod lense array units are repetitively arranged on a plane perpendicular to the optical axis direction.

In the rod lens array unit of an aspect of the present invention, each of the operating wavelength bands is set by effecting passing wavelength band restriction for a color-less rod lens.

In the rod lens array unit of an aspect of the present invention, each of the operating wavelength band is set by bonding a passing wavelength band restricting member to the end face of the color-less rod lens.

In the rod lens array unit of an aspect of the present invention, the refractive index distribution type rod lenses are colored.

In the rod lens array unit of an aspect of the present invention, each predetermined wavelength is set within the corresponding operating wavelength band.

In the rod lens array unit of an aspect of the present invention, the plural kinds of refractive index distribution type rod lenses are equal to one another in length among all the kinds, and have focusing parameters which are different among the kinds.

In the rod lens array unit of an aspect of the present invention, the plural kinds of refractive index distribution type rod lenses have the same focusing parameters among all the kinds, and are different in length among the kinds.

Further, in order to attain the above object, according to the present invention, there is provided an image scanner comprising a light source for irradiating light to an original to be read out, a photodetector for detecting an image of the original which is formed on the basis of light from the original, and the above rod lens array disposed between the original and the photodetector in order to form the image.

In the image scanner of an aspect of the present invention, a three primary color light source is used as the light source.

In the image scanner of an aspect of the present invention, the three primary color light source comprises three primary color LEDs.

In the image scanner of an aspect of the present invention, three kinds of refractive index distribution type rod lenses are used, and each of the predetermined wavelengths of the three kinds of rod lenses is selected within a wavelength area where a power is 1% or more of the respective peak power of an emission spectrum of the three primary color light source.

In the image scanner of an aspect of the present invention, a color image sensor array having three primary color photodetecting elements is used as the photodetector.

In the image scanner of an aspect of the present invention, three kinds of refractive index distribution type rod lenses are used, and each of the predetermined wavelengths of the three kinds of rod lenses are selected within a wavelength area where a sensitivity is 1% or more of the respective peak sensitivity of the three primary color photodetecting elements.

In the image scanner of an aspect of the present invention, two kinds of refractive index distribution type rod lenses are used, and as the predetermined wavelengths of the two kinds of rod lenses are selected from at least one of a first intermediate wavelength and a second intermediate wavelength which are respectively located between respective two adjacent peak wavelengths of three peak wavelengths where the light emission spectrum of the three primary color light source has a peak value. When the first intermediate wavelength or the second intermediate wavelength is adopted as one predetermined wavelength, the peak wavelength other than the adjacent peak wavelengths at both the sides of the intermediate wavelength thus adopted is adopted as the other predetermined wavelength, or a wavelength located away from the peak wavelength concerned with respect to the adopted intermediate wavelength is adopted as the other predetermined wavelength.

That is, in the present invention, by narrowing the operating wavelength band of the rod lens, occurrence of chromatic aberration is reduced. When a wavelength range to be required is broad, the range is divided into plural bands, image focusing is shared by plural kinds of rod lenses having relatively narrow operating wavelengths, and the image focusing characteristic is properly set about each rod lens, thereby substantially reducing the overall chromatic aberration of the array.

Here, the operating wavelength band of a rod lens is defined as a wavelength range in which a light beam emitted from a point on the optical axis of the rod lens passes through the rod lens and arrives at the imaging face to be detected as an image signal at a rate equal to or more than 1% of the maximum value of the image signal, at an equi-magnification focusing state.

The operating wavelength band may be set by disposing a passing wavelength band restricting member comprising a colored member such as a color filter or the like in the optical path at the outside of the rod lens, by coloring the rod lens itself to restrict the passing wavelength band or by using a photosensor having a suitable photosensitivity characteristic.

Any of organic material and inorganic material may be used for the rod lenses.

BRIEF DESCRIPTION OF THE DRAWINGS

FIG. 16 is a partially enlarged end view of a rod lens array according to a seventh embodiment of the present invention;

FIG. 17 is a partially enlarged end view of a rod lens array according to an eighth embodiment of the present invention;

FIG. 20 is a side view showing a rod lens array unit according to a tenth embodiment of the present invention;

FIG. 21 is an end view of the rod lens array unit of the tenth embodiment shown in FIG. 20;

FIG. 22 is an end view of a rod lens array unit according to an eleventh embodiment of the present invention;

FIG. 23 is a partially enlarged end view of a rod lens array according to a twelfth embodiment of the present invention;

FIG. 29 is a partially enlarged end view of a rod lens array of a seventeenth embodiment according to the present invention;

FIG. 30 is a cross-sectional view showing the rod lens array of the seventeenth embodiment shown in FIG. 29;

BEST MODES OF THE INVENTION

Preferred embodiments according to the present invention will be described hereunder with reference to the accompanying drawings.

(First Embodiment)

Figure 1:
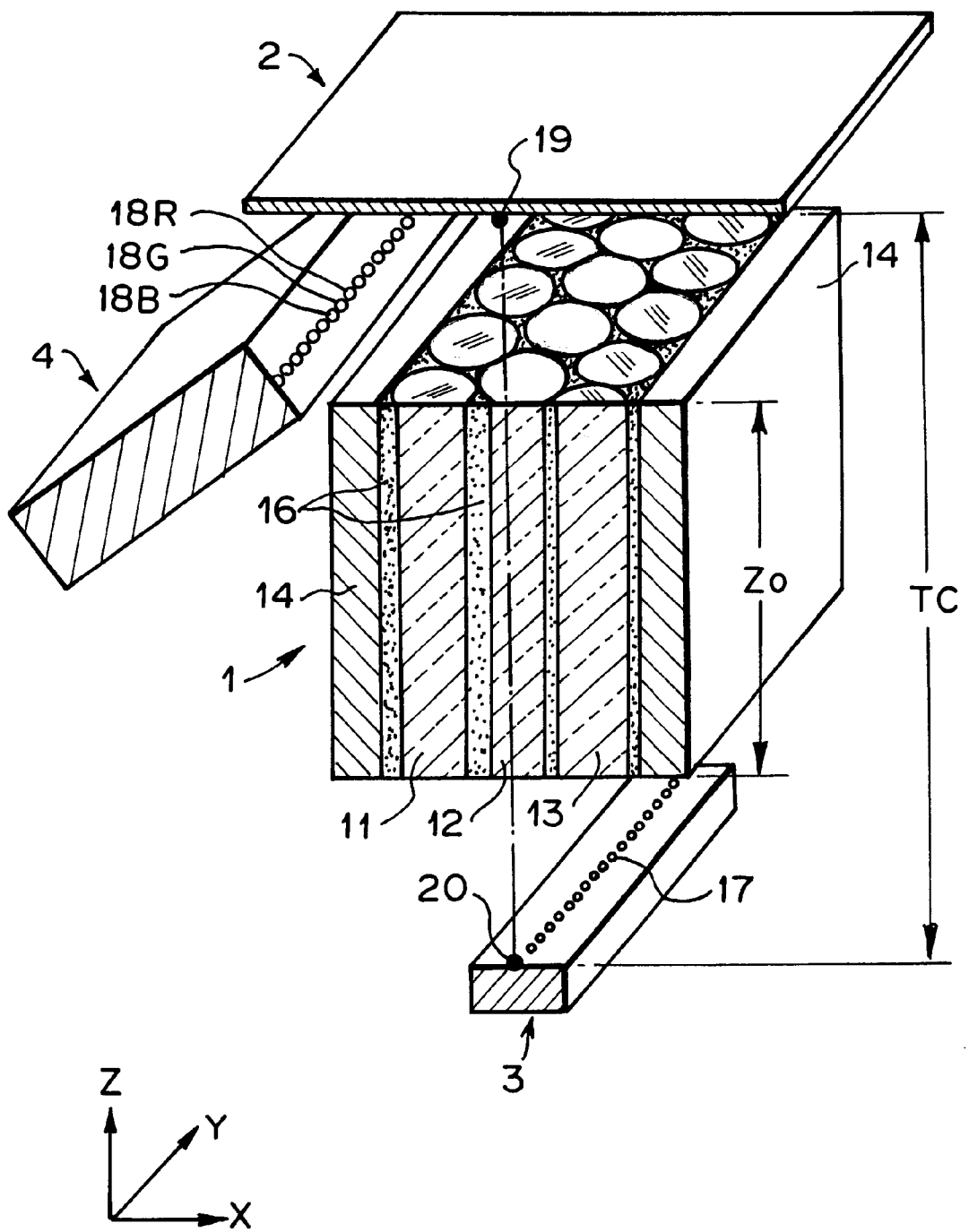
FIG. 1 is a cross-sectional and perspective view showing the construction of an embodiment of an image scanner using a rod lens array of a first embodiment according to the present invention.
Figure 2:
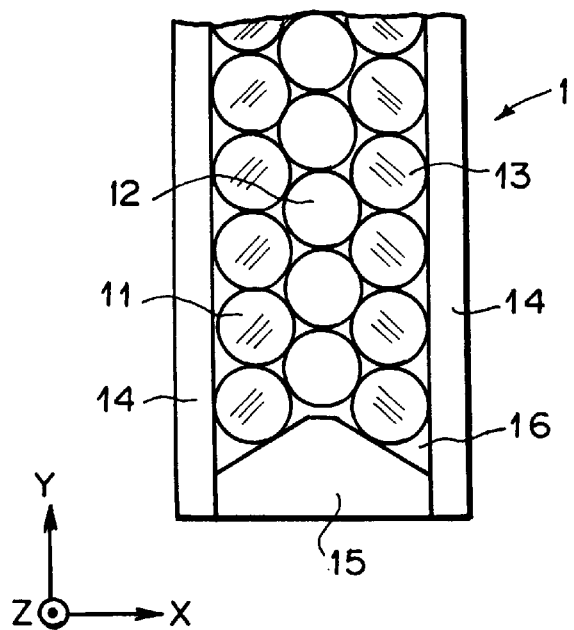
FIG. 2 is a partially enlarged end view showing the rod lens array of the first embodiment shown in FIG. 1.

FIG. 1 is a cross-sectional perspective view showing the construction of an embodiment of an image scanner using a rod lens array according to a first embodiment of the present invention, and FIG. 2 is a partially enlarged end view of the rod lens array of the first embodiment. In this embodiment, the rod lens array is constructed by three kinds of rod lenses.

In FIGS. 1 and 2, reference numeral 1 represents a rod lens array, reference numeral 2 represents an original to be read out, reference numeral 3 represents a CCD monochromatic image sensor array, and reference numeral 4 represents an illuminating LED array including three primary color LEDs which are arranged in order.

The rod lens array 1 is formed as follows. A number of three kinds of rod lenses 11, 12 and 13 which are respectively different in operating wavelength band and characteristic are arranged in the Y-direction so that each rod lens is disposed along the Z-direction, thereby forming respective color rod lens arrays. These three kinds of rod lens arrays thus arranged are further arranged in the X-direction to obtain a rod lens assembly so that the rod lenses are most closely packed (hereinafter referred to as "close-pack stacking"). Thereafter, end members 15 are put at both ends of the above assembly in the Y-direction, and then the assembly is sandwiched by two side plates 14 in the X-direction as shown in FIG. 1. Finally, adhesive 16 is filled into the surrounding portions around the outer peripheral surfaces of the rod lenses to fix the rod lenses and fabricate the rod lens array 1. The rod lenses 11 are colored with red, the rod lenses 12 are colored with green and the rod lenses 13 are colored with blue.

The original 2 is fed in the X-direction by feeding means (not shown), and the image sensor array 3 comprises a number of photodetecting elements 17 arranged in the Y-direction.

The LED array 4 comprises a large number of red (R) light emission LEDs 18R, green (G) light emission LEDs 18G and blue (B) light emission LEDs 18B for emitting light beams of three primary colors (red, green and blue), which are repetitively arranged in the Y-direction in this order.

When a color image reading operation is carried out, the LEDs 18R, 18G and 18B of the LED array 4 are successively switched to be turned on. The red (R) light reflected by the lower surface of the original 2 is mainly passed through the rod lenses 11 and then focused onto the image sensor array 3. The green (G) light reflected by the lower surface of the original 2 is mainly passed through the rod lenses 12 and then focused onto the image sensor array 3. The blue (B) light reflected by the lower surface of the original 2 is passed through the rod lenses 13, and focused onto the image sensor array 3. Thereafter, image information signals of R, G and B are obtained at the output of the image sensor array.

When the rod lenses and the light emission spectra of the LEDs are combined as described above, the focusing parameters g of the three kinds of rod lenses 11, 12 and 13 are set to different values among the three kinds of rod lenses so that the conjugate length TC at a predetermined wavelength calculated with the equation (2) (which is determined in accordance with each rod lens as described later) is equal among the three kinds of rod lenses. Accordingly, the light reflected from an object point 19 at a reading position of the original 2 to which the three primary color illumination light is irradiated is passed through the respective rod lenses corresponding to each primary color, whereby the reflection light can be excellently focused to the same focusing point 20 on the monochromatic image sensor array 3 at all times. Accordingly, the effect of the chromatic aberration can be suppressed to the minimum level, and the resolution can be remarkably enhanced.

Next, a design method of the rod lenses corresponding to the respective light emission colors as described above will be described.

First, the predetermined wavelengths ($\lambda$si: i=1, 2, 3) corresponding to the three kinds of rod lenses 11, 12 and 13 are set. The predetermined wavelength is a reference wavelength to determine the conjugate length TC, and basically it may be set to any value within the operating wavelength band. As an example, the predetermined wavelengths can be made coincident with the peak wavelengths ($\lambda$pj: j=1, 2, 3) of the light emission spectra of the respective primary color LEDs. That is, the predetermined wavelength ($\lambda$s1) of the rod lenses 11 is set to 660 nm, the predetermined wavelength ($\lambda$s2) of the rod lenses 12 is set to 525 nm, and the predetermined wavelength ($\lambda$s3) of the rod lenses 13 is set to 450 nm.

Secondly, the operating wavelength bands (WBi: i=1,2,3) corresponding to the three kinds of rod lenses 11, 12 and 13 are set. The operating wavelength band of each kind of rod lenses is preferably set so as to increase the transmittance of the light of the light emission spectrum of the corresponding LED, but reduce the transmittance of the light e of the light emission spectra of the other two LEDs. The operating wavelength bands of the respective kinds of rod lenses are preferably set so that at least one of the difference between the upper limit values of the operating wavelength bands and the difference between the lower limit values of the operating wavelength bands is set to 20 nm or more, and more preferably so that at least one of the differences is set to 50 nm or more.

Figure 3:
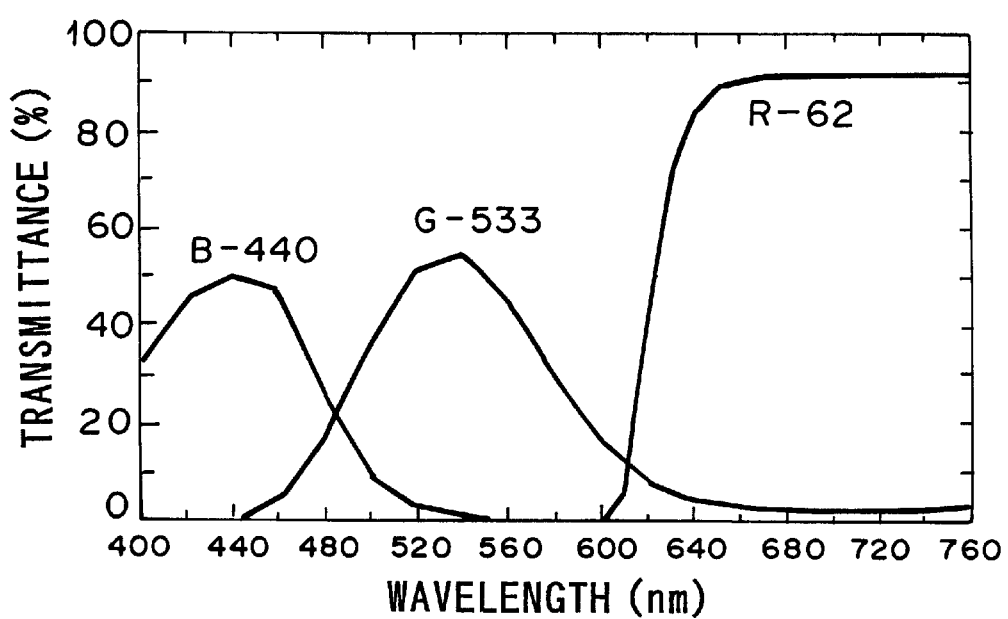
FIG. 3 is a diagram showing spectral transmittance characteristics of three kinds of rod lenses of the rod lens array of the first embodiment shown in FIG. 1.

As an example, the operating wavelength band WB1 of the rod lenses 11 is set so as to have a spectral transmittance characteristic of R-62 shown in FIG. 3 so that the light of the R light emission LED 18R having the light emission spectral peak wavelength $\lambda p1$ of 660 nm is passed through the rod lenses 11 at the highest rate. The operating wavelength band WB2 of the rod lenses 12 is set so as to have a spectral transmittance characteristic of G-533 shown in FIG. 3 so that the light of the G light emission LED 18G having the light emission spectral peak wavelength $\lambda p2$ of 525 nm is passed through the rod lenses 12 at the highest rate. The operating wavelength band WB3 of the rod lenses 13 is set so as to have a spectral transmittance characteristic of B-440 shown in FIG. 3 so that the light of the B light emission LED 18B having the light emission spectral peak wavelength $\lambda p3$ of 450 nm is passed through the rod lenses 13 at the highest rate. The same spectral transmittance curves (characteristics) as described above are obtained by optical filters produced by Hoya Corp., and the respective kinds of rod lenses can be obtained by coloring the rod lenses themselves so that the same spectral transmittance characteristics can be obtained.

In the case of actual LEDs, the peak wavelength of the light emission spectrum is varied every LED, and there is a case where the distribution of the light emission spectrum of every LED is not the same in the strict sense. Accordingly, the operating wavelength band is preferably set to a value near to the average peak wavelength of the light emission spectrum of each color LED which is determined in consideration of the characteristic of an individual LED and the dispersion thereof.

Each predetermined wavelength is set to a wavelength within each operating wavelength band. The difference between the respective predetermined wavelengths is preferably set to 20 to 360 nm. Further, it is preferably set to a wavelength near to the wavelength in a substantially center area of the range of the light emission spectral distribution of light after the light emitted from the light source passes through the rod lens concerned, with taking a weight in the spectral distribution into consideration.

Thirdly, for example for the G rod lenses 12, the conjugate length TC at the predetermined wavelength of 525 nm and the lens length $Z_o$ are settled, and the g value (g2) is calculated with the equation (2). For the other R and B rod lenses 11, 13, the conjugate length at each of the predetermined wavelengths of 660 nm and 450 nm is set to the same conjugate length TC at the predetermined wavelength 525 nm of the G rod lenses 12 under the condition that the lens length of the R and B rod lenses 11, 13 is set to the same as the G rod lenses 12, and the g values (g1, g3) in this case are calculated with the equation (2). As a result, the g value (g1) of the R rod lenses 11 at the wavelength of 525 nm is higher than the g value (g2) of the G rod lenses 12, and the g value (g3) of the B rod lenses 13 at the wavelength of 525 nm is lower than the g value (g2) of the G rod lenses 12. The g values (gi: i=1, 2, 3) at the predetermined wavelengths ($\lambda$si) of the respective color rod lenses are substantially equal to each other.

The characteristic values of the rod lenses 11, 12 and 13 which are designed in the manner as described above are shown in the following table 2.

TABLE 2

| | | ROD LENS | | |
|---|---|---|---|---|
| | | (11) | (12) | (13) |
| PREDETERMINED WAVELENGTH [nm] | | 660 | 525 | 450 |
| TC [mm] | AT EACH $\lambda$ | 9.10 | 9.10 | 9.10 |
| | AT 570 nm | 8.70 | 9.42 | 10.34 |
| g [mm$^{-1}$] | AT EACH $\lambda$ | 0.8887 | 0.8883 | 0.8879 |
| | AT 570 nm | 0.8985 | 0.8814 | 0.8643 |
| $n_o$ | AT EACH $\lambda$ | 1.508 | 1.514 | 1.519 |
| | AT 570 nm | 1.512 | 1.512 | 1.512 |
| LENS LENGTH $Z_o$ [mm] | | | 4.20 | |

* $\lambda$ represents predetermined wavelength

Figure 4:
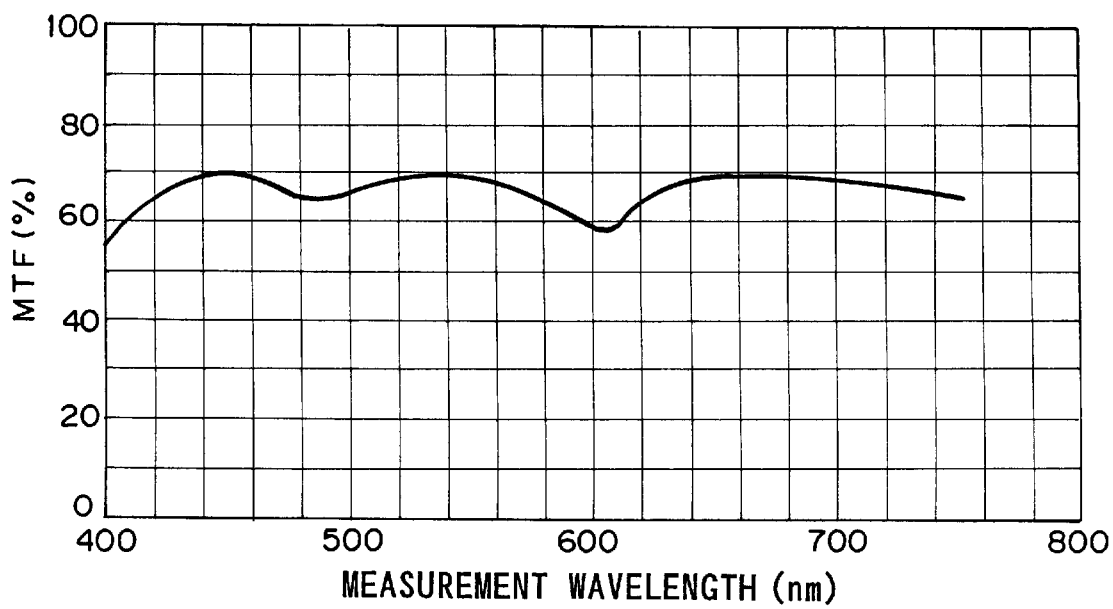
FIG. 4 is a diagram showing a measurement result of MTF of the rod lens array of the first embodiment shown in FIG. 1.
Figure 5:
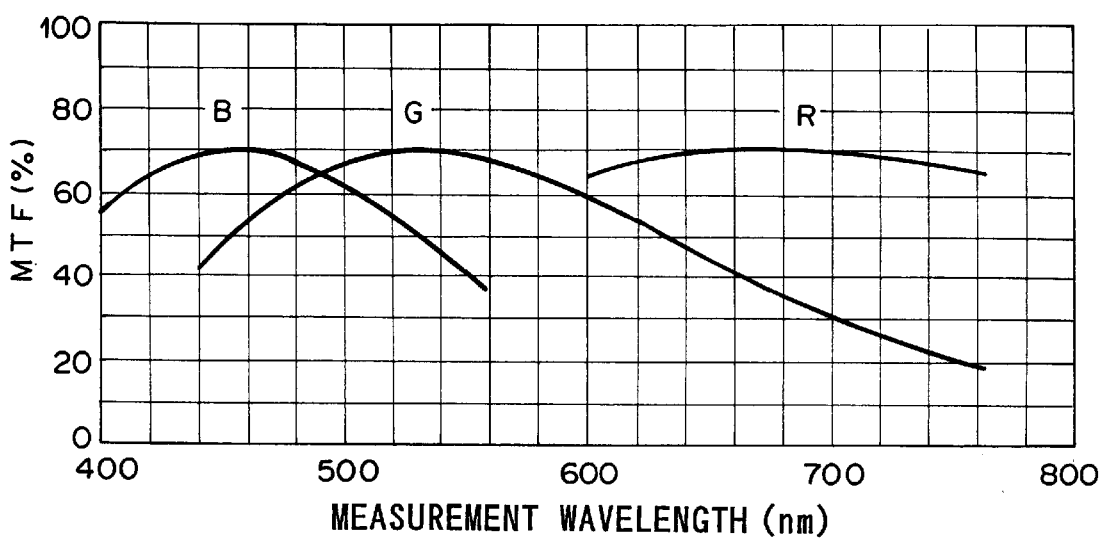
FIG. 5 is a diagram showing a measurement result of MTF of the rod lens array comprising the three kinds of rod lenses of the rod lens array of the first embodiment shown in FIG. 1.

FIG. 4 shows a measurement result (the same measuring method as described above was used) of MTF in a visible light wavelength range (400 to 760 nm) of the rod lens array obtained by arranging the three kinds of rod lenses 11, 12 and 13 on three lines as shown in FIGS. 1 and 2. For reference, the measurement result of MTF in the visible light wavelength range of each rod lens array obtained by arranging each kind of rod lenses 11 12, 13 solely is shown as R, G, B in FIG. 5.

Figure 33:
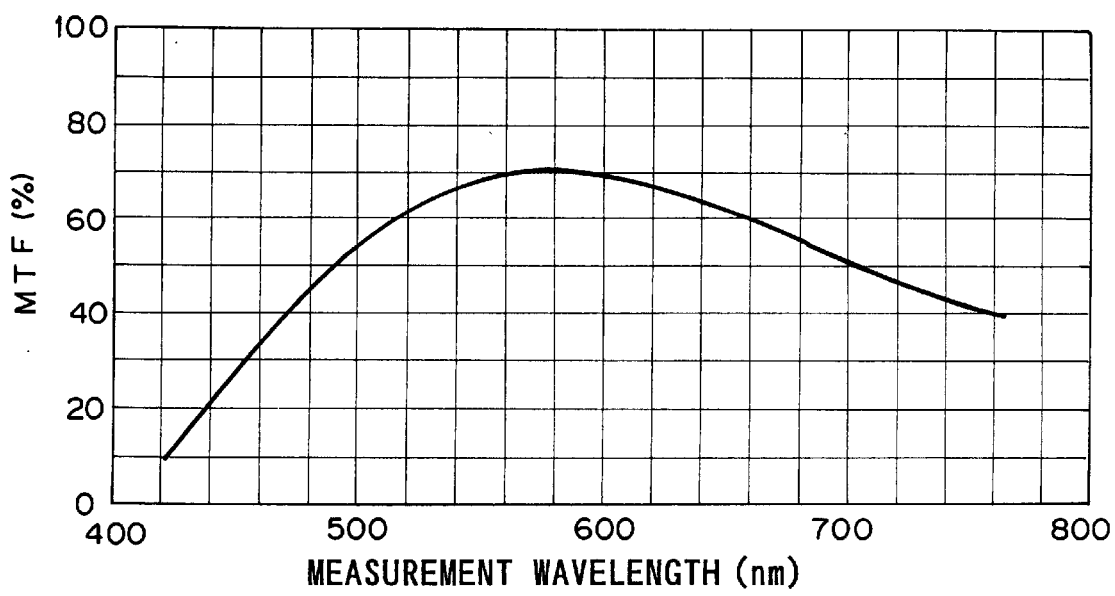
FIG. 33 is a diagram showing a measurement result of MTF of a conventional plastic rod lens array.

Since the base portions (skirt portions) of the spectral transmittance characteristic curves of the three kinds of rod lenses are overlapped with one another as shown in FIG. 3, the operating wavelength bands of the rod lenses 12 and 13 are overlapped with each other at 480 nm, for example, so that light beams passing through both the rod lenses arrive at the image sensor array and are focused thereon. Therefore, MTF is slightly reduced at specific wavelengths as shown in FIG. 4, however, substantially 60% or more MTF is kept. This means that the resolution performance is sufficient to practical use. As compared with MTF of the conventional rod lens array shown in FIG. 33, it is found out that the MTF values in the R and B wavelength regions are more remarkably enhanced.

Particularly, the MTF values at the light emission peak wavelengths of the respective LEDs which are selected as the redetermined wavelengths when the device is designed are shown in the following table 3.

TABLE 3

| | LED | | |
|---|---|---|---|
| | (R) | (G) | (B) |
| PEAK WAVELENGTH [nm] | 660 | 525 | 450 |
| CORRESPONDING ROD LENS | (11) | (12) | (13) |
| MTF [%] | 69 | 69 | 69 |

As described above, this embodiment is particularly effective to a case where it is applied to a color image scanner using as a light source three primary color LED arrays having a sharp light emission spectral distribution, however, it may be sufficiently effectively applied to a combination of a white color light source and a color image sensor array.

The predetermined wavelength is preferably located in an overlapped wavelength range between the operating wavelength band and the half band width wavelength range of the corresponding color LED light emission spectrum. However, since a rod lens array having small chromatic aberration according to the present invention has practically sufficient MTF even if the predetermined wavelength is out of the light emission wavelength range, the predetermined wavelength may be out of the light emission wavelength range. When the predetermined wavelength is out of the light emission wavelength range, the MTF value trend to decrease, however, it can be set to a practically sufficiently high value.

As described above, it is preferable that the predetermined wavelength is within the wavelength range of the light emission spectrum, however, it is not necessarily within the wavelength range.

The following is a method of manufacturing the three kinds of rod lenses as described above. For example, for each rod lens, three or more kinds of uncured mixtures composed of organic polymer and monomer are coaxially multilayered to form a fiber-shaped uncured laminate body whose refractive index is successively reduced from the center portion to the outer peripheral portion. The laminate body is subjected to a curing treatment to obtain an refractive index distribution type optical fiber so that the refractive index distribution continuously varies between the adjacent layers of the laminate body while components are mutually diffused between the adjacent layers or after the mutual diffusion is carried out (see Japanese Patent Application Laid-open No. Hei-3-174105). The refractive index distribution type optical fiber thus obtained is cut to the required length as described above. In order to set the operating wavelength bands of the rod lenses, coloring agent such as dye or the like may be suitably added to the uncured mixtures. The setting of the focusing parameters g of the rod lenses may be performed by suitably selecting the material of the uncured mixture to adjust the refractive index difference between the adjacent layers or drawn the fiber to reduce the diameter of the fiber, or using the above methods in combination.

In the first embodiment described above, the passing wavelength is restricted by coloring the rod lenses themselves to thereby set the operating wavelength bands. Accordingly, the reflection loss when the light is incident to/emitted from the rod lenses can be minimized. The same effect can be obtained when colorless rod lenses having a broad passing wavelength range are used and colored bodies such as the optical filters R-62, G-533, B-440 are disposed as a passing wavelength range restricting member at the incident end face sides or emission end face sides of the rod lenses. These colored bodies may be merely disposed in the route of light passing through these rod lenses, and thus they may be adhesively attached to the end faces of the rod lenses or arranged away from the end faces at a suitable distance.

(Second Embodiment)

Figure 6:
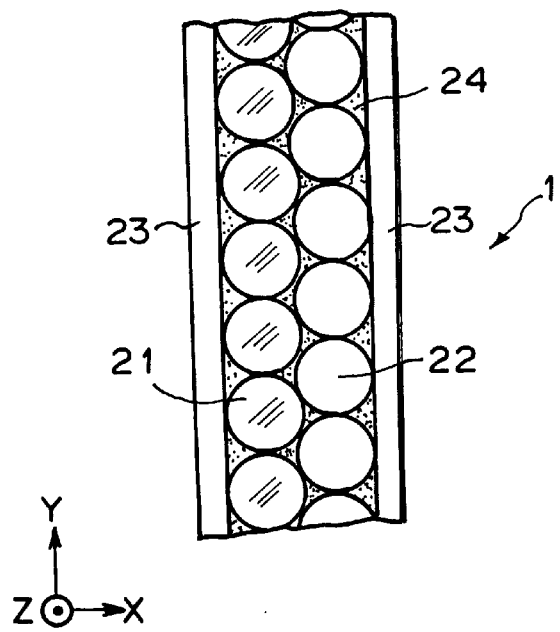
FIG. 6 is a partially enlarged end view showing a rod lens array according to a second embodiment of the present invention.

FIG. 6 is a partially enlarged end view of a rod lens array according to a second embodiment of the present invention. The rod lens array of the second embodiment can be applied to an image scanner constructed as shown in FIG. 1.

In FIG. 6, the rod lens array 1 is formed as follows. A number of two kinds of rod lenses 21, 22 which are respectively different in operating wavelength band and characteristic and have the same length are arranged in the Y-direction so that each rod lens is disposed along the Z-direction, thereby forming respective color rod lens arrays. These two kinds of rod lens arrays thus arranged are further arranged in the X-direction to obtain a rod lens assembly so that the rod lenses are most closely packed (close-pack stacking). Thereafter, the assembly is sandwiched by two side plates 23, and adhesive 24 is filled into the surrounding portions around the outer peripheral surfaces of the rod lenses to fix the rod lenses and fabricate the rod lens array 1.

The predetermined wavelength ($\lambda$s1) of the rod lenses 21 is set to 590 nm which is substantially the intermediate wavelength between the peak wavelength ($\lambda$p1) of the light emission spectrum for the red (R) LED and the peak wavelength ($\lambda$p2) of the light emission spectrum for green (G) LED, and the predetermined wavelength ($\lambda$s2) of the rod lenses 22 is set to 480 nm which is substantially the intermediate wavelength between the peak wavelength ($\lambda$p2) of the light emission spectrum of the green (G) LED and the peak wavelength ($\lambda$p3) of the light emission spectrum of the blue (B) LED.

Figure 7:
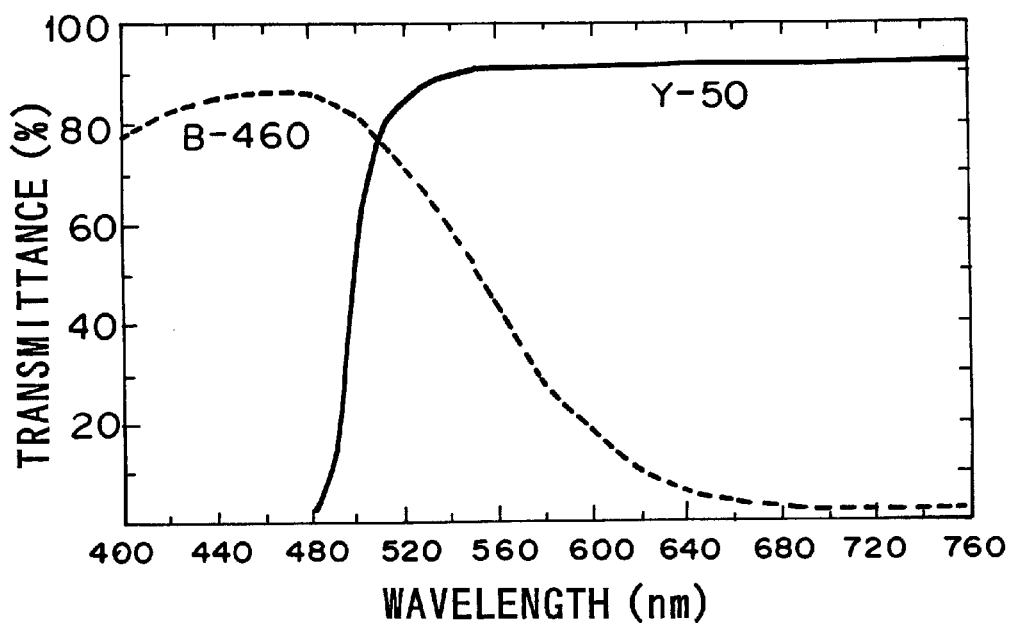
FIG. 7 is a diagram showing the spectral transmittance characteristics of two kinds of rod lenses of the rod lens array of the second embodiment shown in FIG. 6.

The operating wavelength band (WB1) of the rod lenses 21 is set so as to realize a spectral transmittance characteristic of Y-50 shown in FIG. 7 so that R light and G light are passed through the rod lenses 21. The operating wavelength band WB2 of the rod lenses 22 is set so as to realize a spectral transmittance characteristic of B-460 shown in FIG. 7 so that G light and B light are passed through the rod lenses 22. That is, the operating wavelength bands of the two kinds of rod lenses are partially overlapped with each other. These spectral transmittance characteristic curves are the same as obtained by the optical filter produced by Hoya Corp., and each rod lens can be obtained by coloring so as to have the same spectral transmittance characteristic.

The focusing parameters g of the rod lenses 21, 22 are set on the basis of the equation (2) in the same manner as the first embodiment so that the conjugate length TC at the predetermined wavelength of each rod lens is equal to that of the other rod lens.

The characteristic values of the rod lenses 21, 22 thus designed are shown in the following table 4.

TABLE 4

|  |  | ROD LENS | |
|---|---|---|---|
|  |  | (21) | (22) |
| PREDETERMINED WAVELENGTH [nm] |  | 590 | 480 |
| TC [mm] | AT EACH $\lambda$ | 9.10 | 9.10 |
|  | AT 570 nm | 8.99 | 9.89 |
| g [mm$^{-1}$] | AT EACH $\lambda$ | 0.8885 | 0.8881 |
|  | AT 570 nm | 0.8911 | 0.8721 |
| n$_o$ | AT EACH $\lambda$ | 1.511 | 1.517 |
|  | AT 570 nm | 1.512 | 1.512 |
| LENS LENGTH Z$_o$ [mm] |  | 4.20 | |

* $\lambda$ represents predetermined wavelength

Figure 8:
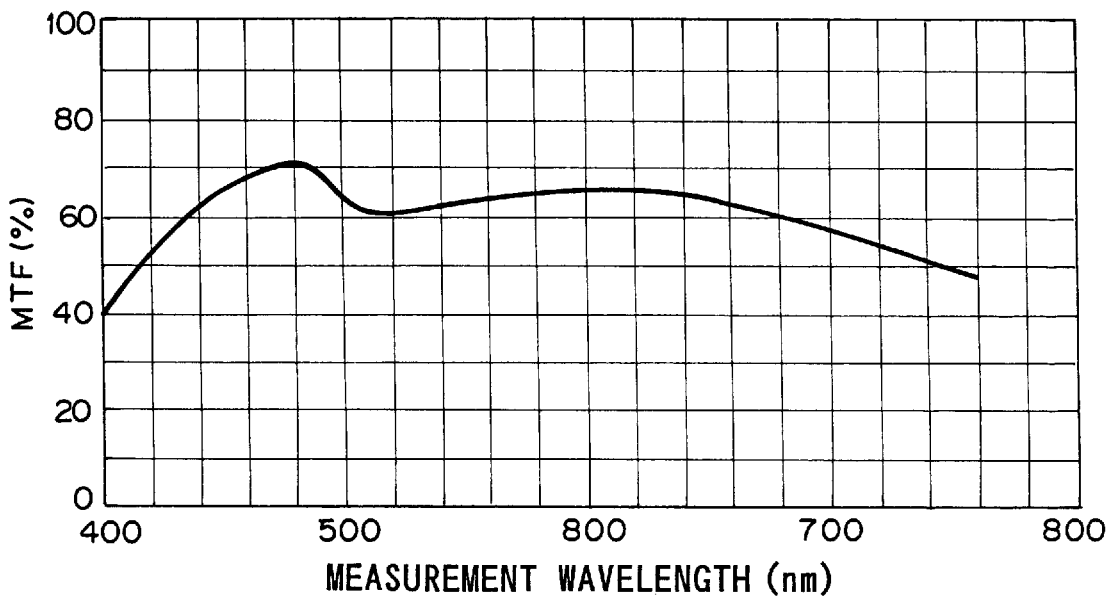
FIG. 8 is a diagram showing a measurement result of MTF of the rod lens array of the second embodiment shown in FIG. 6.
Figure 9:
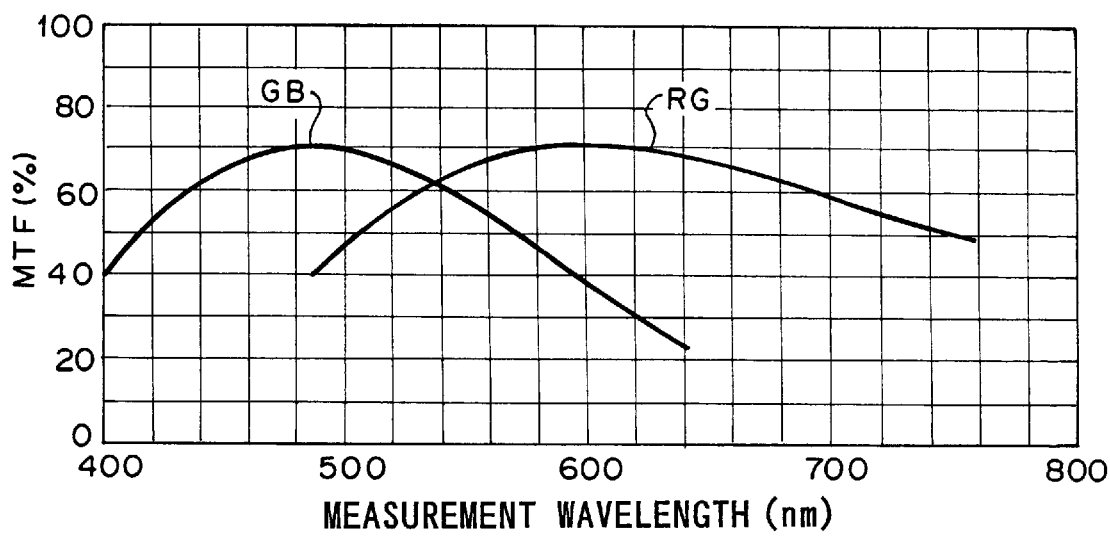
FIG. 9 is a diagram showing a measurement result of MTF of the rod lens array comprising the two kinds of rod lenses of the rod lens array of the second embodiment shown in FIG. 6.

FIG. 8 shows a measurement result (the measuring method is described above) of MTF in a visible light wavelength range of the rod lens array 1 having the two kinds of rod lenses 21 and 22 thus obtained which are arranged in two lines as shown in FIG. 6. For reference, measurement results of MTF in the visible light wavelength range of rod lens arrays obtained by arranging each of the rod lenses 21, 22 solely are represented by RG, GB respectively in FIG. 9.

As shown in FIG. 8, MTF is reduced to be slightly less than 50% for some specific wavelengths, however, practically feasible resolution performance can be obtained. It is found out that as compared with MTF of the conventional rod lens array shown in FIG. 33, the MTF value at about 600 nm is lower, however, the MTF values in the R and B wavelength regions can be remarkably enhanced as a whole.

Particularly, the MTF value at the light emission peak wavelength of each LED is shown in the following table 5.

TABLE 5

| | LED | | |
|---|---|---|---|
| | (R) | (G) | (B) |
| PEAK WAVELENGTH [nm] | 660 | 525 | 450 |
| CORRESPONDING ROD LENS | (21) | (21, 22) | (22) |
| MTF [%] | 62 | 61 | 65 |

As described above, this embodiment is particularly effective to a case where it is applied to a color image scanner using as a light source three primary color LED arrays having a sharp light emission spectral distribution, however, it may be applied to a case where a white light source is used.

[Third Embodiment]

Figure 10:
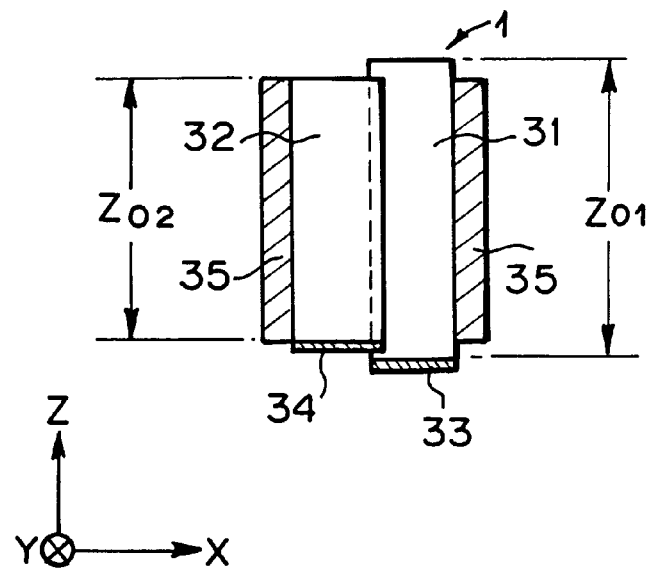
FIG. 10 is a cross-sectional view showing a rod lens array according to a third embodiment of the present invention.
Figure 11:
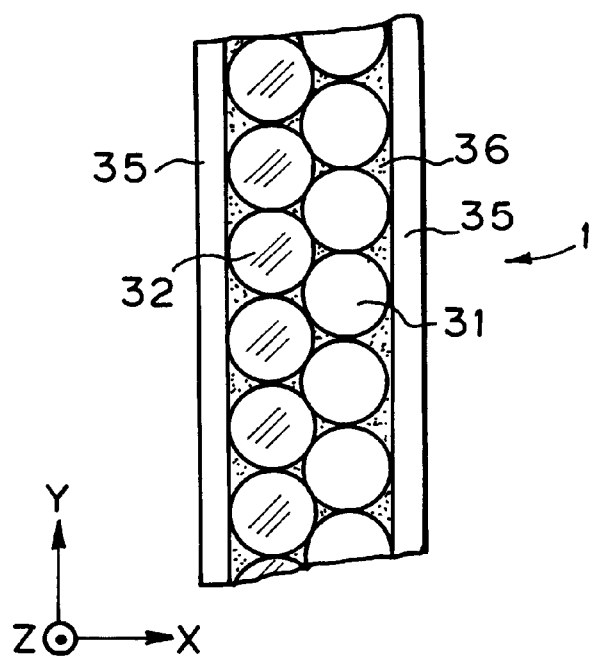
FIG. 11 is a partially enlarged end view showing the rod lens array of the third embodiment shown in FIG. 10.

FIG. 10 is a cross-sectional view showing a rod lens array according to a third embodiment of the present invention, and FIG. 11 is a partially enlarged end view of the rod lens array shown in FIG. 10. The rod lens array of the third embodiment can be applied to an image scanner constructed as shown in FIG. 1.

In FIGS. 10 and 11, the rod lens array 1 is formed as follows. A number of two kinds of rod lenses 31, 32 which have the same focusing parameter g and different in length are arranged in the Y-direction so that each rod lens is disposed along the Z-direction, thereby forming respective color rod lens arrays. These two kinds of rod lens arrays thus arranged are further arranged in the X-direction to obtain a rod lens assembly so that the rod lenses are most closely packed (close-pack stacking). Thereafter, the assembly thus obtained is sandwiched by two side plates 35, and adhesive 36 is filled into the surrounding portions around the outer peripheral surfaces of the rod lenses to bond the rod lenses to one another. Thereafter, the Y-50 filter 33 shown in FIG. 7 is adhesively attached to the lower end surface of each rod lens 31 and the B-460 filter 34 shown in FIG. 7 is adhesively attached to the lower end face of each rod lens 32. Here, the center of the rod lens 31 and the center of the rod lens 32 in the Z-direction are substantially located on the same plane.

The predetermined wavelengths and the operating wavelength bands of the rod lenses 31, 32 with the filters 33, 34 are the same as those of the rod lenses 21, 22 described with respect to the second embodiment.

The characteristic values of the rod lenses 31, 32 thus designed are shown in the following table 6.

TABLE 6

| | | ROD LENS | |
|---|---|---|---|
| | | (31) | (32) |
| PREDETERMINED WAVELENGTH [nm] | | 590 | 480 |
| TC [mm] | AT EACH λ | 9.10 | 9.10 |
| | AT 570 nm | 8.994 | 9.917 |
| g [mm$^{-1}$] | AT EACH λ | 0.8859 | 0.9045 |
| | AT 570 nm | 0.8885 | 0.8885 |
| n$_o$ | AT EACH λ | 1.511 | 1.517 |
| | AT 570 nm | 1.512 | 1.512 |
| LENS LENGTH Z$_o$ [mm] | | 4.20 | 4.10 |

* λ represents predetermined wavelength

In the third embodiment, the focusing parameters g of the two kinds of rod lenses are set to be equal to each other, and the lens length $Z_{o1}$, $Z_{o2}$ of each of the two kinds of the rod lenses is set on the basis of the equation (2) so that the conjugate length TC at the predetermined wavelength of each rod lens is equal to that of the other rod lens. Even when the focusing parameters g of the two kinds of rod lenses are not equal to each other, the lens length $Z_o$ can be adjusted on the basis of the equation (2) to equalize the conjugate length TC at the predetermined wavelength between the two kinds of the lenses.

(Fourth Embodiment)

Figure 12:
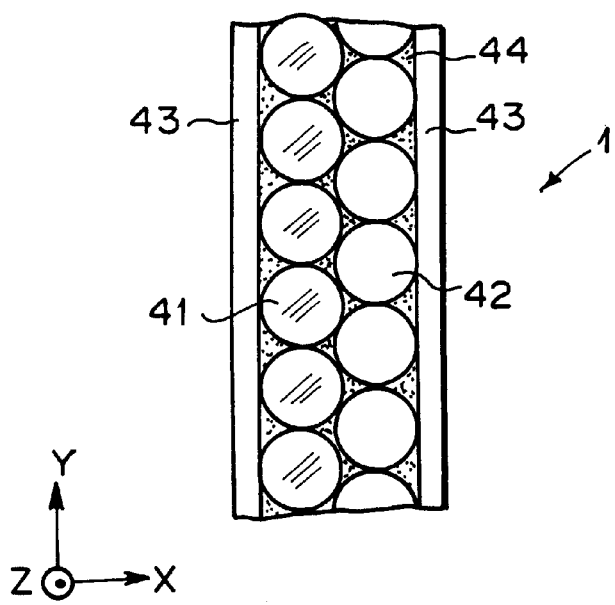
FIG. 12 is a partially enlarged end view of a rod lens array according to a fourth embodiment of the present invention.

FIG. 12 is a partially enlarged end view showing a rod lens array according to a fourth embodiment of the present invention. The rod lens array of this embodiment may be applied to such an image scanner as shown in FIG. 1.

In FIG. 12, the rod lens array 1 is formed as follows. A number of two kinds of rod lenses 41, 42 which are respectively different in operating wavelength band and characteristic and have the same length are arranged in the Y-direction so that each rod lens is disposed along the Z-direction, thereby forming respective color rod lens arrays. These two kinds of rod lens arrays thus arranged are further arranged in the X-direction to obtain a rod lens assembly so that the rod lenses are most closely packed (close-pack stacking). Thereafter, the assembly is sandwiched by two side plates 43, and adhesive 44 is filled into the surrounding portions around the outer peripheral surfaces of the rod lenses to fix the rod lenses and fabricate the rod lens array 1.

The predetermined wavelength (λs1) of the rod lens 41 is set to the peak wavelength (λp1) of the light emission spectrum of the R LED (660 nm), and the predetermined wavelength (λs2) of the rod lens 42 is set to the substantially intermediate wavelength (480 nm) between the peak wavelength (λp2) of the light emission spectrum of the G LED and the peak wavelength (λp3) of the light emission spectrum of the B LED.

Figure 13:
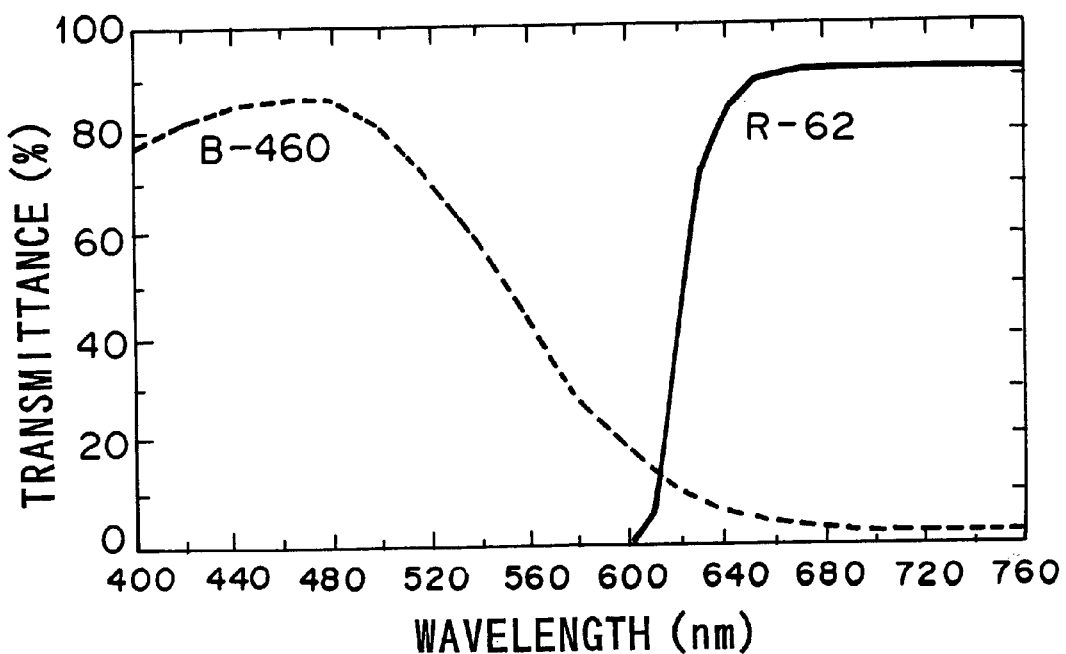
FIG. 13 is a diagram showing the spectral transmittance characteristic of two kinds of rod lenses of the rod lens array of the fourth embodiment shown in FIG. 12.

The operating wavelength band (WB1) of the rod lens 41 is set so as to realize the spectral transmittance characteristic of R-62 shown in FIG. 13 so that the R light can be passed through the rod lens 41. Further, the operating wavelength band (WB2) of the rod lens 42 is set so as to realize the spectral transmittance characteristic of B-460 shown in FIG. 7 so that the G light and the B light can be passed through the rod lens 42. The operating wavelength bands of the two kinds of rod lenses are partially overlapped with each other, however, the overlap degree of the operating wavelength bands is significantly smaller than that of the operating wavelength bands shown in FIG. 7.

The focusing parameter g of the rod lenses 41, 42 are set on the basis of the equation (2) as in the case of the second embodiment so that the conjugate length TC at the predetermined wavelength of one rod lens 41 is equal to that of the other rod lens 42.

The characteristic values of the rod lenses 41, 42 thus designed are shown in the following table 7.

TABLE 7

| | | ROD LENS | |
|---|---|---|---|
| | | (41) | (42) |
| PREDETERMINED WAVELENGTH [nm] | | 660 | 480 |
| TC [mm] | AT EACH λ | 9.10 | 9.10 |
| | AT 570 nm | 8.70 | 9.89 |
| g [mm$^{-1}$] | AT EACH λ | 0.8887 | 0.8881 |
| | AT 570 nm | 0.8985 | 0.8721 |
| n$_o$ | AT EACH λ | 1.508 | 1.517 |
| | AT 570 nm | 1.512 | 1.512 |
| LENS LENGTH Z$_o$ [mm] | | 4.20 | |

* λ represents predetermined wavelength

The MTF values at the light emission peak wavelengths of the respective LEDs of the rod lens array 1 obtained by arranging the two kinds of rod lenses 41, 42 thus obtained in two lines as shown in FIG. 12 are shown in the following table 8.

TABLE 8

|  | LED | | |
|---|---|---|---|
|  | (R) | (G) | (B) |
| PEAK WAVELENGTH [nm] | 660 | 525 | 450 |
| CORRESPONDING ROD LENS | (41) | (42) | (42) |
| MTF [%] | 67 | 65 | 65 |

As described above, according to this embodiment, the second predetermined wavelength is set to an intermediate wavelength between the center peak wavelength (peak wavelength of G light) in the three primary color light emission spectral distributions of the LED array and one adjacent peak wavelength (peak wavelength of B light) which is nearer to the center peak wavelength, and the first predetermined wavelength is set to the other adjacent peak wavelength (peak wavelength of R light) which is farther from the center peak wavelength, thereby suppressing occurrence of chromatic aberration due to existence of R light distribution which is relatively far away from the other two distributions.

When the intervals between the respective peak wavelengths are equal to each other, a preferable one of the peak wavelength at the short-wavelength side and the peak wavelength at the long-wavelength side is suitably selected as the first predetermined wavelength from the viewpoint of the purpose of using the rod lenses.

As described above, according to the present invention, this embodiment is particularly effectively applied to a color image scanner using as a light source three primary color LED arrays having a sharp light emission spectral distribution.

(Fifth Embodiment)

Figure 14:
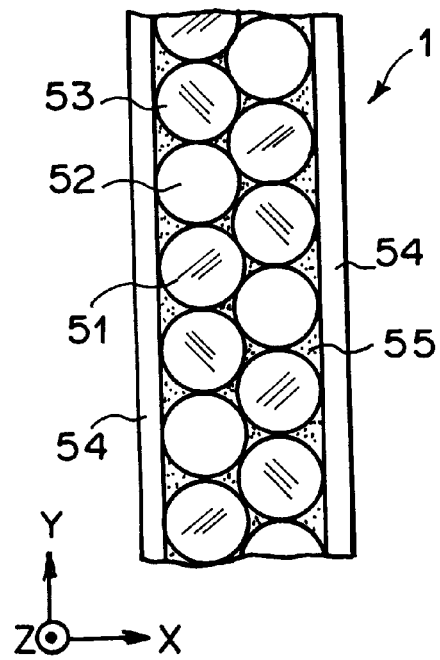
FIG. 14 is a partially enlarged end view of a rod lens array according to a fifth embodiment of the present invention.

FIG. 14 is a partially enlarged end view showing a rod lens array according to a fifth embodiment of the present invention. The rod lens array of this embodiment may be applied to such an image scanner as shown in FIG. 1.

In FIG. 14, the rod lens array 1 is formed as follows. A number of three kinds of rod lenses 51, 52 and 53 which are respectively different in operating wavelength band and characteristic (which are similar to the rod lenses 11, 12, 13 of the first embodiment, for example) are repetitively arranged in turn in this order in the Y-direction so that each rod lens is disposed along the Z-direction, thereby obtaining a linear assembly of the three kinds of rod lenses. Two linear assemblies thus obtained are arranged in the X-direction so that the rod lenses are most closely packed. Thereafter, these assemblies are sandwiched by two side plates 54, and adhesive 55 is filled into the surrounding portions around the outer peripheral surfaces of the rod lenses to fix the rod lenses and fabricate the rod lens array 1. The rod lenses are positioned so that the same kinds of rod lenses are not adjacent to one another.

In this embodiment, the three kinds of rod lenses are disposed in a specific arrangement, and the rod lenses are arranged in two lines, whereby the thickness of the rod lens array can be reduced and the optical characteristics thereof can be made uniform.

(Sixth Embodiment)

Figure 15:
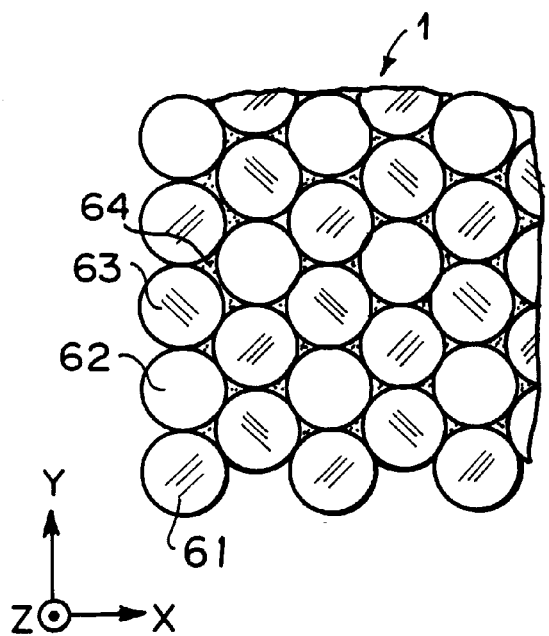
FIG. 15 is a partially enlarged end view of a rod lens array according to a sixth embodiment of the present invention.

FIG. 15 is a partially enlarged end view of a rod lens array according to a sixth embodiment of the present invention. The rod lens array of this embodiment is designed in a plate shape to be extended on X-Y plane, and it may be applied to a two-dimensional image sensor, an image display device, etc.

In FIG. 15, the rod lens array 1 is formed as follows. Three kinds of rod lenses 61, 62 and 63 (which are similar to the rod lenses 11, 12, 13 of the first embodiment, for example) having different operating wavelength bands and different characteristics are arranged so as to be closely packed on the X-Y plane while the each rod lens is disposed along the Z-direction, and then adhesive 64 is filled into the surrounding portions around the outer peripheral surfaces of the rod lenses to fix the rod lenses and fabricate the rod lens arrays 1. However, the rod lenses are arranged so that the same kind of rod lenses are not adjacent to one another as in the case of the fifth embodiment.

According to this embodiment, the optical characteristics can be also made uniform as in the case of the fifth embodiment.

(Seventh Embodiment)

FIG. 16 is a partially enlarged end view of a rod lens array according to a seventh embodiment of the present invention. The rod lens array of this embodiment may be applied to such an image scanner as shown in FIG. 1.

In FIG. 16, the rod lens array 1 is formed as follows. A number of three kinds of rod lenses 71, 72 and 73 (which are similar to the rod lenses 11, 12, 13 of the first embodiment, for example) having different operating wavelength bands and different characteristics are arranged repetitively arranged in turn in this order in the Y-direction so that each rod lens is disposed along the Z-direction, the assembly thus obtained is sandwiched by two side plates 74, and then adhesive 75 is filled into the surrounding portions around the outer peripheral surfaces of the rod lenses to fix the rod lenses and fabricate the rod lens array 1.

In this embodiment, the three kinds of rod lenses are disposed in a specific arrangement and the rod lenses are arranged in a line, whereby the thickness of the rod lens array can be reduced and the optical characteristic can be made uniform.

(Eighth Embodiment)

FIG. 17 is a partially enlarged end view of a rod lens array according to an eighth embodiment of the present invention. The rod lens array 1 of this embodiment may be applied to such an image scanner as shown in FIG. 1.

In FIG. 17, the rod lens array 1 is formed as follows. A number of two kinds of rod lenses 81, 82 having different operating wavelength bands and different characteristics (which are similar to the rod lens arrays 21, 22 of the second embodiment, for example) are alternately arranged in the Y-direction so that each rod lens is disposed along the Z-direction, the assembly thus obtained is sandwiched by two side plates 84 and then adhesive 85 is filled into the surrounding portions of the outer peripheral surfaces of the rod lenses to fix the rod lenses and fabricate the rod lens array 1.

In this embodiment, the two kinds of rod lenses are alternately arranged in the Y-direction and the rod lenses are arranged in a line, whereby the thickness of the rod lens array can be reduced and the optical characteristic can be made uniform.

(Ninth Embodiment)

Figure 18:
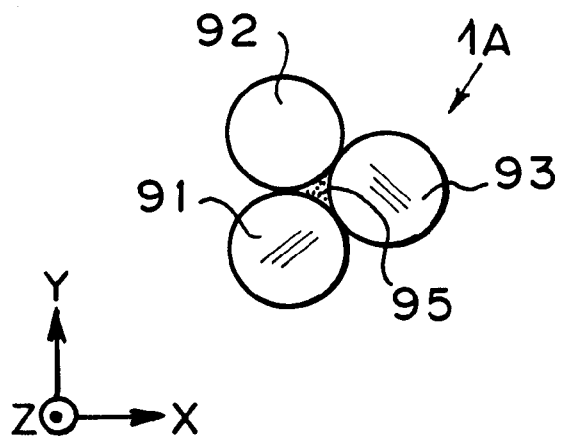
FIG. 18 is an end view of a rod lens array unit according to a ninth embodiment of the present invention.

FIG. 18 is an end view of a rod lens array unit according to a ninth embodiment of the present invention. The rod lens unit of this embodiment may be used to fabricate a rod lens array for an image scanner as shown in FIG. 1.

In FIG. 18, a rod lens array unit 1A is formed by arranging three rod lenses 91, 92, 93 having different operating wavelength bands and different characteristics (which are similar to the rod lenses 11, 12, 13 of the first embodiment, for example) so as to be adjacent to one another while each rod lens is disposed along the Z-direction, and then filling adhesive 95 into an area surrounded by the outer peripheral surfaces of the three rod lenses to fix the rod lenses.

Figure 19:
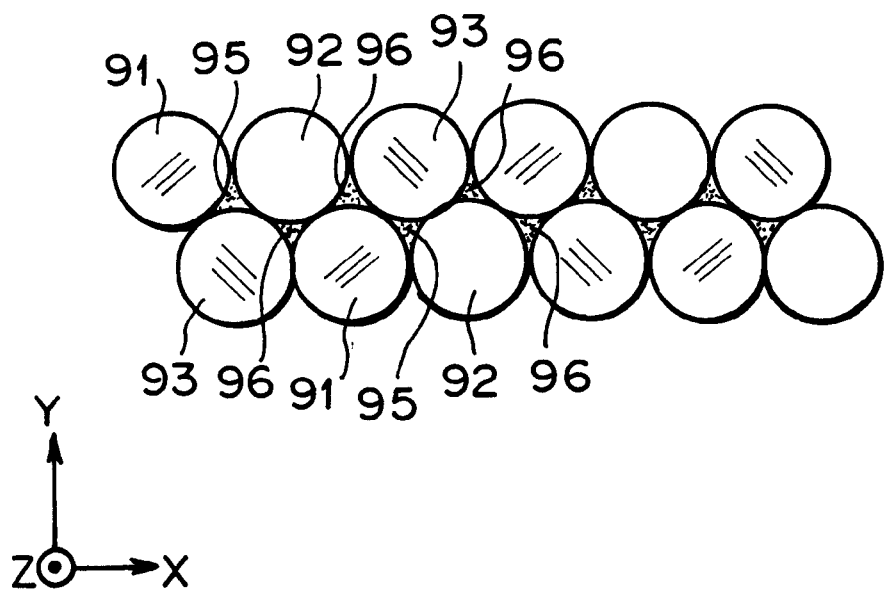
FIG. 19 is an end view of a rod lens array obtained by repetitively arranging and bonding a plurality of rod lens array units of the ninth embodiment of FIG. 18 on X-Y plane.

FIG. 19 is an end view of a rod lens array obtained by repetitively arranging a plurality of rod lens array units 1A thus obtained on the X-Y plane and bonding these rod lens array units 1A to one another. In FIG. 19, reference numeral 96 represents adhesive used when the rod lens array units 1A are bonded to one another, and the adhesive 96 may be the same as or different from the adhesive 95. The rod lens array units 1A are preferably arranged so that the same kind of rod lenses are not adjacent to one another. With the above fabrication, the same rod lens array as the fifth embodiment shown in FIG. 14 can be obtained.

By suitably setting the arrangement of plural rod lens array units 1A, the same rod lens array as the sixth embodiment shown in FIG. 15 can be obtained.

The rod lens array unit 1A may be used alone as a single lens having low chromatic aberration.

(Tenth Embodiment)

FIG. 20 is a side view showing a rod lens array unit according to a tenth embodiment of the present invention, and FIG. 21 is an end view of the tenth embodiment. The rod lens array unit of the tenth embodiment may be used to fabricate a rod lens array for an image scanner as shown in FIG. 1.

In FIGS. 20, 21, the rod lens array unit 1A is formed as follows. Three kinds of colorless rod lenses 101, 102, 103 which have the same focusing parameter g, but are different in length are disposed so as to be adjacent to one another while each rod lens is disposed along the Z-direction, and adhesive 107 is filled into an area surrounded by the outer peripheral surfaces of the three rod lenses to fix the rod lenses. Further, first, second and third filters 104, 105 and 106 are adhesively attached to the lower end surfaces of the rod lenses 101, 102 and 103 respectively, thereby forming the rod lens array unit 1A. The centers of the three rod lenses 101, 102, 103 with respect to the Z-direction (longitudinal direction) are located on the same plane.

The predetermined wavelengths and the operating wavelength bands of the rod lenses 101, 102, 103 with the filters 104, 105, 106 are set to those of the three kinds of rod lenses of the first embodiment, for example. However, in this embodiment, the rod lenses 101, 102, 103 are designed so that the length $Z_o$ is different among the rod lenses, but the conjugate length TC at each predetermined wavelength is equal among the rod lenses.

The rod lens array unit 1A of this embodiment can be used in the same manner as the ninth embodiment.

(Eleventh Embodiment)

FIG. 22 is an end view showing a rod lens array unit according to an eleventh embodiment of the present invention. The rod lens array unit of this embodiment may be applied to a plate-shaped lens, a compact-size equi-magnified focusing device having low chromatic aberration, etc.

In FIG. 22, the rod lens array unit 1A is formed as follows. Seven rod lenses 111 to 117 having different operating wavelength bands and different characteristics are arranged so as to be stacked in a hexagonal form so that each rod lens is disposed along the Z-direction, and adhesive 118 is filled in each area surrounded by the outer surfaces of the rod lenses to fix the rod lenses. The focusing parameters g of the rod lenses 111 to 117 may be set so that all the rod lenses have the same length $Z_o$ and the same conjugate length TC at the respective predetermined wavelengths.

The predetermined wavelengths and the operating wavelength bands may be suitably set by the same method as described in the first and second embodiments. In this embodiment, since the seven operating wavelength bands are set, the design to reduce the chromatic aberration can be further facilitated.

A plurality of such rod lens array units 1A are repetitively arranged and bonded to one another on the X-Y plane to obtain the rod lens array 1 as in the case of the ninth embodiment.

The rod lens array unit 1A may be solely used as a single lens having low chromatic aberration.

(Twelfth Embodiment)

FIG. 23 is a partially enlarged end view showing a rod lens array of a twelfth embodiment according to the present invention. The rod lens array of this embodiment is designed in a plate-shape so as to extend on the X-Y plane, and it may be applied to a two-dimensional image sensor, a picture display device, etc.

In FIG. 23, the same reference numerals as shown in FIG. 15 are represented by the same reference numerals. However, according to this embodiment, the three kinds of arrays each of which comprise the same kind of rod lenses 61, 62, 63 arranged in a line in the Y-direction are repetitively arranged in this order in the X-direction so as to be stacked in a close-pack arrangement, so that the same rod lenses are not adjacent to one another in the X-direction.

(Thirteenth Embodiment)

Figure 24:
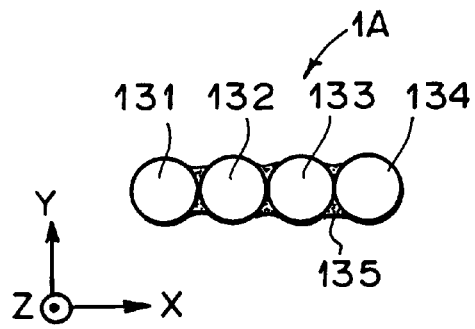
FIG. 24 is an end view of a rod lens array unit according to a thirteenth embodiment of the present invention.

FIG. 24 is an end view showing a rod lens array unit according to a thirteenth embodiment according to the present invention. The rod lens array unit of this embodiment may be used to fabricate a rod lens array of an image scanner as shown in FIG. 1.

In FIG. 24, the rod lens array unit 1A is formed as follows. Four rod lenses 131, 132, 133 and 134 having different operating wavelength bands and different characteristics (whose characteristics are set by the same manner of the eleventh embodiment, for example) are arranged in this order in the X-direction while each rod lens is disposed along the Z-direction, and the neighboring rod lenses are bonded to one another by adhesive 135.

The rod lens array unit 1A thus constructed may be solely used as a single lens having low chromatic aberration, and may be used to fabricate a rod lens array by arranging and bonding a plurality of rod lens array units 1A in the Y-direction and/or the X-direction. When the rod lens array units are arranged in the Y-direction, the arrangement density can be enhanced by arranging the rod lens array units in a slant direction in the form of the close-pack stacking.

(Fourteenth Embodiment)

Figure 25:
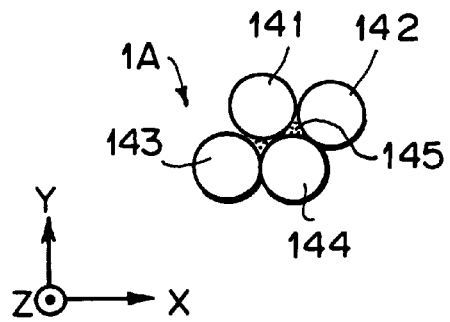
FIG. 25 is an end view of a rod lens array unit according to a fourteenth embodiment of the present invention.

FIG. 25 is an end view showing a rod lens array unit according to a fourteenth embodiment according to the present invention. The rod lens array unit of this embodiment may be applied to a rod lens array of an image scanner as shown in FIG. 1.

In FIG. 25, the rod lens array unit 1A is formed as follows. Four rod lenses 141, 142, 143, 144 having different operating wavelength bands and different characteristics (which are similar to the rod lenses of the thirteenth embodiment, for example) are stacked in a close-pack arrangement while each rod lens is disposed along the Z-direction, and the neighboring rod lenses are bonded to one another by adhesive 145.

The rod lens array unit 1A may be solely used as a single lens having low chromatic aberration, or may be used to fabricate a rod lens array by disposing in a close-pack stacking arrangement and bonding a plurality of rod lens array units 1A in the Y-direction and/or the X-direction.

(Fifteenth Embodiment)

Figure 26:
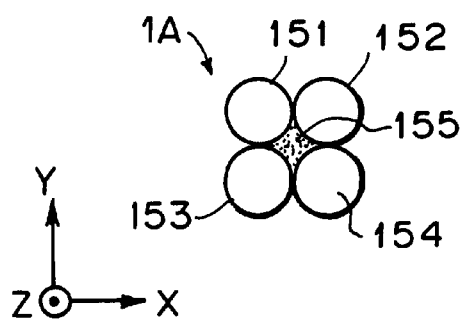
FIG. 26 is an end view of a rod lens array unit according to a fifteenth embodiment of the present invention.

FIG. 26 is an end view showing a rod lens array unit according to a fifteenth embodiment according to the present invention. The rod lens array unit of this embodiment may be applied to a rod lens array of an image scanner as shown in FIG. 1.

In FIG. 26, the rod lens array unit 1A is formed as follows. Four rod lenses 151, 152, 153, 154 having different operating wavelength bands and different characteristics (which are similar to the rod lenses of the thirteenth embodiment, for example) are arranged in a 2×2 matrix form in the X-direction and the Y-direction while each rod lens is disposed along the Z-direction, and adhesive 155 is filled into an area surrounded by the outer peripheral surfaces of the rod lenses to bond the rod lenses.

The rod lens array unit 1A may be solely used as a single lens having low chromatic aberration, or may be used to fabricate a rod lens array by arranging and bonding a plurality of rod lens array units 1A in the Y-direction and/or the X-direction. When the rod lenses are arranged in the X-direction and the Y-direction, the arrangement density can be enhanced by disposing the rod lenses in a slant direction in a close-pack stacking arrangement.

(Sixteenth Embodiment)

Figure 27:
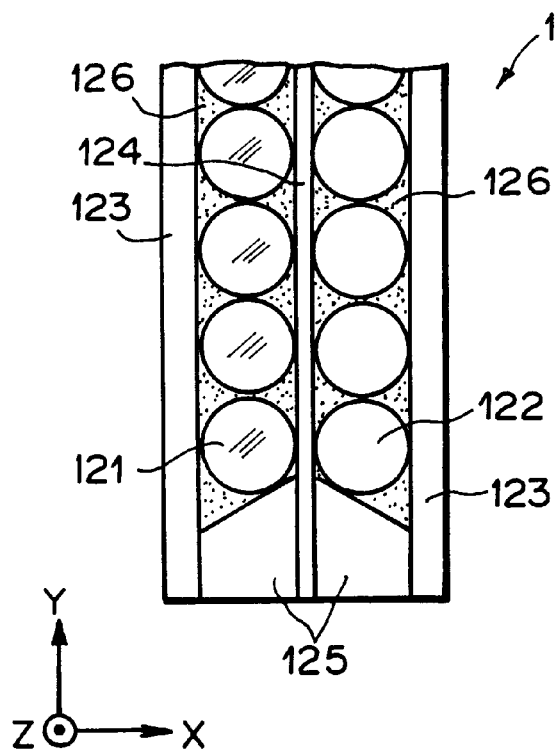
FIG. 27 is a partially enlarged end view of a rod lens array according to a sixteenth embodiment of the present invention.
Figure 28:
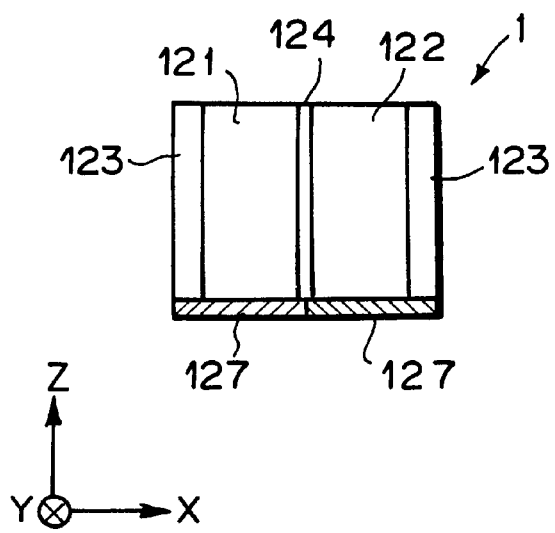
FIG. 28 is a cross-sectional view showing the rod lens array of the sixteenth embodiment shown in FIG. 27.
Figure 31:
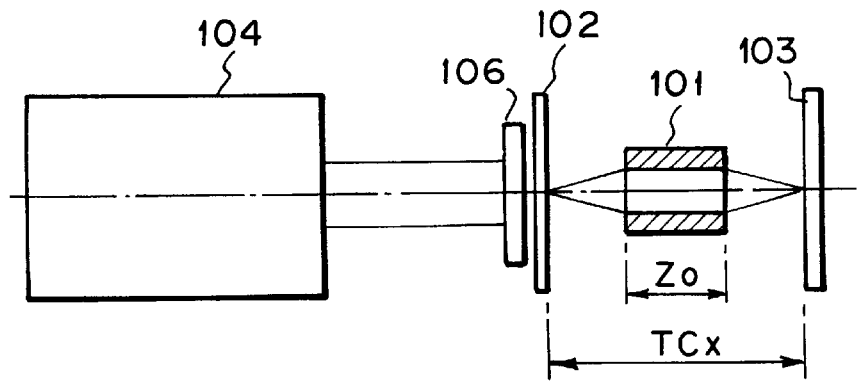
FIG. 31 is a diagram showing a method of measuring MTF.
Figure 34:
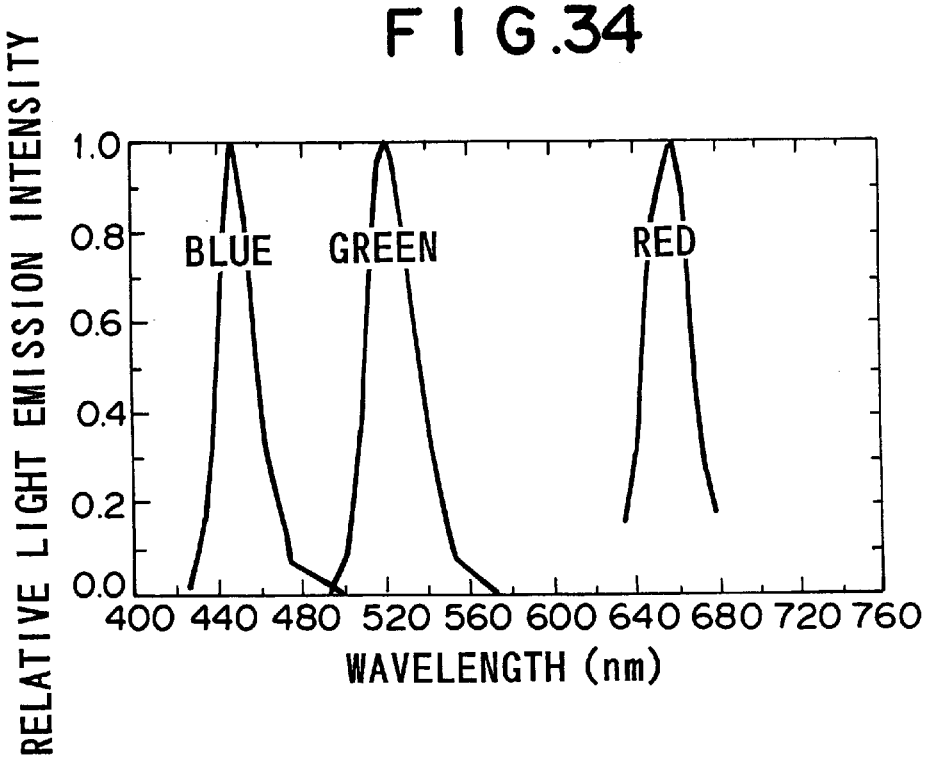
FIG. 34 is a diagram showing the light emission spectral characteristics of three primary color LEDs.
Figure 32:
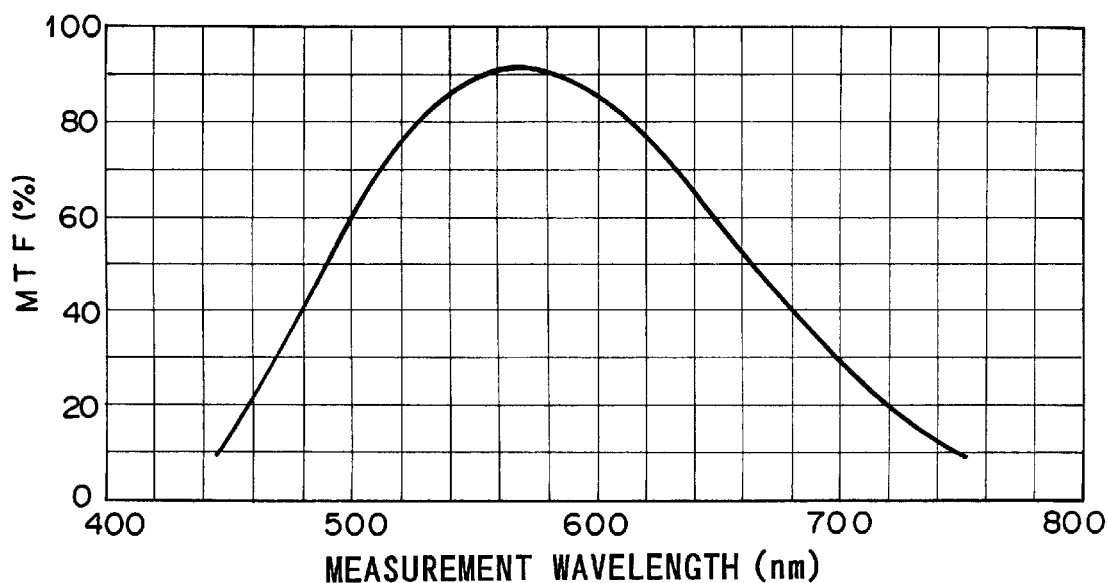
FIG. 32 is a diagram showing a measurement result of MTF of a conventional glass rod lens array.

FIG. 27 is a partially enlarged end view of a rod lens array according to a sixteenth embodiment of the present invention, and FIG. 28 is a cross-sectional view of FIG. 27. The rod lens array of this embodiment may be applied to an image scanner as shown in FIG. 1.

In FIGS. 27 and 28, the rod lens array 1 is formed as follows. A number of two kinds of rod lenses 121, 122 having different focusing parameters g and the same length are arranged in the Y-direction while each rod lens is disposed along the Z-direction, thereby forming two kinds of rod lens arrays. Thereafter, these two kinds of rod lens arrays are arranged in the X-direction while a partition plate 124 serving as a bulkhead is interposed between the two kinds of rod lens arrays. These rod lens arrays are sandwiched by two side plates 123 and adhesive 126 is filled into the surrounding portions around the outer peripheral surfaces of the rod lenses 121 to fix the rod lenses. Further, such a filter 127 as Y-50 shown in FIG. 7 is adhesively attached to the lower end face of the array of the rod lenses 121, and such a filter 128 as B-460 shown in FIG. 7 is adhesively attached to the lower end face of the array of the rod lenses 122. Reference numeral 125 represents an end member.

The predetermined wavelengths, operating wavelength bands and the focusing parameters of the rod lenses 121, 122 with the filters 127, 128 are the same as the rod lenses 21, 22 of the second embodiment.

In this embodiment, the array of the rod lenses 121 and the array of the rod lenses 122 are disposed so as to be partitioned by the partition plate 124 with respect to the X-direction. Therefore, a slender simple stripe-shaped filter can be used as each of the filters 127, 128 for each of the arrays of the rod lenses 121, 122.

(Seventeenth Embodiment)

FIG. 29 is a partially enlarged end view of a rod lens array according to a seventeenth embodiment of the present invention, and FIG. 30 is a cross-sectional view of FIG. 29. The rod lens array of this embodiment may be applied to an image scanner as shown in FIG. 1.

In FIGS. 29 and 30, the same elements as shown in FIGS. 10 and 11 are represented by the same reference numerals, and reference numeral 37 represents an end member. In this embodiment, each of the array of the rod lenses 31 and the array of the rod lenses 32 is sandwiched by side plates 35, and then the side plates of these arrays are bonded to each other. As described above, since the array of the rod lenses 31 and the array of the rod lenses 32 are disposed so as to be partitioned with respect to the X-direction by the bulkhead (which is a joint body of two side plates 35), a slender simple stripe-shaped filter may be used as the filter 33, 34 for each array of the rod lenses 31, 32. Further, the rod lens array of this embodiment can be readily manufactured by bonding the array of the rod lenses 31 and the array of the rod lenses 32 which are independently manufactured.

According to the above-described embodiments, the three primary color LED array is used as a three primary color light source. However, in the present invention, a semiconductor laser diode (LD) or a combination of s white light source and a spectroscopic element such as an optical filter may be used as the three primary color light source. As the white light source may be used a filament lamp, a fluorescent lamp, a plasma light emitting device, a fluorescent display tube, various discharge lamps, etc.

According to the above-described embodiments, the three primary color light source and the monochromatic image sensor array are used in combination. However, in the present invention, a white light source and a color image sensor array (containing three primary color filters) may be used in combination. In this case, when varying the above embodiments by replacing the light emission spectral power characteristic of the three primary color light source by the spectral sensitivity characteristic of the three primary color photodetecting elements of the color image sensor array, the same effect as the above-described embodiments can be obtained. For example, as the predetermined wavelengths of the three kinds of rod lenses may be selected wavelengths within a wavelength region in which 1% or more of the peak sensitivity of the three primary color photodetecting elements of the color image sensor array can be obtained.

Industrial Applicability

As described above, according to the present invention, the high-resolution image reading operation can be performed at low cost and with sufficiently suppressing the chromatic aberration by using the rod lens array which is excellent in compactness and brightness and has a relatively short conjugate length.

What is claimed is:

1. A rod lens array containing plural kinds of refractive index distribution type rod lenses, characterized in that the plural kinds of refractive index distribution type rod lenses have respective operating wavelength bands and respective predetermined wavelengths which are different between the kinds, each predetermined wavelength being set within each operating wavelength band, and the conjugate length at each predetermined wavelength is set to be substantially equal between the plural kinds of refractive index distribution type rod lenses.

2. The rod lens array as claimed in claim 1, wherein said refractive index distribution type rod lenses are bonded to one another so as to be arranged in parallel to one another and aligned with one another in at least one direction perpendicular to the optical axis direction.

3. The rod lens array as claimed in claim 1 or 2, wherein each of the operating wavelength bands is set by effecting passing wavelength band restriction for a color-less rod lens.

4. The rod lens array as claimed in claim 1 or 2, wherein each of the operating wavelength bands is set by arranging a passing wavelength band restricting member on the optical path of light passing through a color-less rod lens.

5. The rod lens array as claimed in claim 4, wherein said passing wavelength band restricting member is bonded to the end face of said rod lens.

6. The rod lens array as claimed in claim 4, wherein said passing wavelength band restricting member is disposed away from the end face of said rod lens.

7. The rod lens array as claimed in claim 1 or 2, wherein said refractive index distribution type rod lenses are colored.

8. The rod lens array as claimed in any one of claims 1 and 2, wherein at least one predetermined wavelength is the peak wavelength of an emission spectrum of three primary color light sources.

9. The rod lens array as claimed in any one of claims 1 and 2, wherein said plural kinds of refractive index distribution type rod lenses are equal to one another in length among all the kinds, and have focusing parameters different among the kinds.

10. The rod lens array as claimed in any one of claims 1 and 2, wherein said plural kinds of refractive index distribution type rod lenses have the same focusing parameter among all the kinds, and are different in length among the kinds.

11. The rod lens array as claimed in any one of claims 1 and 2, wherein said plural kinds of refractive index distribution type rod lenses are arranged so that the same kind of refractive index distribution type rod lenses are aligned with one another in a first direction perpendicular to the optical axis direction, but are not adjacent to one another in a second direction perpendicular to the optical axis direction.

12. The rod lens array as claimed in claim 11, wherein said plural kinds of refractive index distribution type rod lenses are arranged through bulkheads in the second direction.

13. The rod lens array as claimed in any one of claims 1 and 2, wherein said plural kinds of refractive index distribution type rod lenses are arranged so that the same kind of refractive index distribution type rod lenses are not adjacent to one another.

14. The rod lens array as claimed in claim 13, wherein said plural kinds of refractive index distribution type rod lenses are arranged in alignment with one another in a first direction perpendicular to the optical axis direction.

15. A rod lens array unit containing plural kinds of refractive index distribution type rod lenses, characterized in that said plural refractive index distribution type rod lenses have respective operating wavelength bands and predetermined wavelengths which are different among the kinds, the conjugate length at each of the predetermined wavelengths different among the kinds is set to be substantially equal among all the kinds, and said plural refractive index distribution type rod lenses are bonded to one another so as to be arranged in parallel to one another.

16. The rod lens array unit as claimed in claim 15, wherein said plural refractive index distribution type rod lenses are arranged in such a form that the rod lenses of the adjacent units can be bonded to one another when plural rod lens array units are repetitively arranged on a plane perpendicular to the optical axis direction.

17. The rod lens array unit as claimed in any one of claims 15 and 16, wherein each of the operating wavelength bands is set by effecting passing wavelength band restriction for a color-less rod lens.

18. The rod lens array unit as claimed in any one of claims 15 and 16, wherein each of the operating wavelength band is set by bonding a passing wavelength band restricting member to the end face of the color-less rod lens.

19. The rod lens array unit as claimed in any one of claims 15 and 16, wherein said refractive index distribution rod lenses are colored.

20. The rod lens array unit as claimed in any one of claims 15 and 16, wherein each predetermined wavelength is set within the corresponding operating wavelength band.

21. The rod lens array unit as claimed in any one of claims 15 and 16, wherein said plural kinds of refractive index distribution type rod lenses are equal to one another in length among all the kinds, and have focusing parameters which are different among the kinds.

22. The rod lens array unit as claimed in any one of claims 15 and 16, wherein said plural kinds of refractive index distribution type rod lenses have the same focusing parameters among all the kinds, and are different in length among the kinds.

23. An image scanner comprising:

a light source for irradiating light to an original to be read out;

a photodetector for detecting an image of the original which is formed on the basis of light from the original; and said rod lens array which is claimed in any one of claims 1 and 2 and disposed between the original and said photodetector to form the image.

24. The image scanner as claimed in claim 23, wherein three primary color light sources are used as said light source.

25. The image scanner as claimed in claim 24, wherein said three primary color light sources comprise three primary color LEDs.

26. The image scanner as claimed in claim 24, wherein three kinds of refractive index distribution type rod lenses are used, and the predetermined wavelengths of said three kinds of rod lenses are selected within a wavelength area covering 1% or more of the peak power of an emission spectrum of said three primary color light sources.

27. The image scanner as claimed in claim 23, wherein a color image sensor array having three primary color photodetecting elements is used as said photodetector.

28. The image scanner as claimed in claim 27, wherein three kinds of refractive index distribution type rod lenses are used, and the predetermined wavelengths of said three kinds of rod lenses are selected within a wavelength area covering 1% or more of the peak sensitivity of said three primary color photodetecting elements.

29. The image scanner as claimed in claim 26 and wherein at least one of the predetermined wavelengths is a peak wavelength of a light emission spectrum of three primary color light sources.

30. The image scanner as claimed in claim 24, wherein two kinds of refractive index distribution type rod lenses are used, and the predetermined wavelength of at least one of the two kinds of rod lenses is selected from one of a first intermediate wavelength and a second intermediate wavelength which are respectively located between respective two adjacent peak wavelengths of three peak wavelengths of the light emission spectrum of the three primary color light sources.

* * * * *